(12) United States Patent
Ertel et al.

(10) Patent No.: US 10,781,111 B2
(45) Date of Patent: Sep. 22, 2020

(54) METHOD AND SYSTEM FOR TREATING WASTEWATER

(71) Applicant: Eureka Resources, LLC, Williamsport, PA (US)

(72) Inventors: Daniel J. Ertel, Williamsport, PA (US); Kent McManus, Orchard Park, NY (US); Jerel Bogdan, Cheektowaga, NY (US)

(73) Assignee: Eureka Resources, LLC, Williamsport, PA (US)

( * ) Notice: Subject to any disclaimer, the term of this patent is extended or adjusted under 35 U.S.C. 154(b) by 0 days.

(21) Appl. No.: 16/227,409

(22) Filed: Dec. 20, 2018

(65) Prior Publication Data
US 2019/0119130 A1  Apr. 25, 2019

Related U.S. Application Data

(63) Continuation of application No. 14/746,756, filed on Jun. 22, 2015, now Pat. No. 10,202,286.

(51) Int. Cl.

| | |
|---|---|
| *C02F 1/04* | (2006.01) |
| *B01D 9/00* | (2006.01) |
| *B01D 5/00* | (2006.01) |
| B01D 21/26 | (2006.01) |
| C02F 101/10 | (2006.01) |

(Continued)

(52) U.S. Cl.
CPC .............. *C02F 1/048* (2013.01); *B01D 5/006* (2013.01); *B01D 5/0039* (2013.01); *B01D 9/0031* (2013.01); *B01D 9/0036* (2013.01); *B01D 9/0045* (2013.01); *C02F 1/041* (2013.01); *B01D 21/262* (2013.01); *C02F 2101/10* (2013.01); *C02F 2101/32* (2013.01); *C02F 2101/322* (2013.01); *C02F 2103/10* (2013.01); *C02F 2301/08* (2013.01); *Y02E 60/364* (2013.01)

(58) Field of Classification Search
CPC ... C02F 1/041048; B01D 1/28; B01D 5/0039; B01D 5/006
See application file for complete search history.

(56) References Cited

U.S. PATENT DOCUMENTS

| | | | |
|---|---|---|---|
| 4,444,675 | A | 4/1984 | Goeldner |
| 4,563,283 | A | 1/1986 | Nicksic |
| 4,648,333 | A | 3/1987 | Mudd et al. |
| (Continued) | | | |

OTHER PUBLICATIONS

EagleBurgmann. "Barrier/Buffer Media for Mechanical Seals ." Jan. 26, 2014.u www.bell.si/pdfji/6.%20TESNILA%20IN%20PRITRDILNI%20ELEMENTI/EAGLEBURGMANN/KATALOGI%20PDF/EB%20Barrier%20buffer%20media%20foer%20mechanical%20seal.pdf.

(Continued)

*Primary Examiner* — Jonathan Miller
(74) *Attorney, Agent, or Firm* — Zeller IP Group, PLLC; Kyle M. Zeller

(57) ABSTRACT

Methods and systems for treating brine to produce distilled water and dried NaCl are disclosed. The brine enters a crystallization plant and is heated. Once heated, the brine is circulated to an evaporator. The evaporator increases the concentration of NaCl in the brine to a point about the super saturation level. Once above the super saturation level, NaCl crystals are formed. The larger crystals are circulated to a centrifuge for drying and the smaller crystals are recirculated through the evaporator for continued growth. The NaCl crystals are dried in the centrifuge.

20 Claims, 13 Drawing Sheets

(51) Int. Cl.
*C02F 103/10* (2006.01)
*C02F 101/32* (2006.01)

(56) References Cited

U.S. PATENT DOCUMENTS

| | | | |
|---|---|---|---|
| 4,795,532 A | 1/1989 | Mizutani et al. | |
| 4,895,665 A | 1/1990 | Colelli et al. | |
| 5,011,610 A | 4/1991 | Martin et al. | |
| 5,266,210 A | 11/1993 | McLaughlin | |
| 5,422,012 A | 6/1995 | Adams | |
| 5,879,563 A | 3/1999 | Garbutt | |
| 6,113,797 A | 9/2000 | Al-Samadi | |
| 6,932,909 B2 | 8/2005 | Rey | |
| 7,150,831 B2 | 12/2006 | Dancuart Kohler et al. | |
| 7,244,361 B2 | 7/2007 | Dwyer | |
| 7,255,793 B2 | 8/2007 | Cort | |
| 7,261,820 B2 | 8/2007 | Blakey et al. | |
| 7,322,152 B2 | 1/2008 | Hill | |
| 7,393,454 B2 | 7/2008 | Basset et al. | |
| 7,438,142 B2 | 10/2008 | Butler et al. | |
| 7,497,954 B2 | 3/2009 | Ivan et al. | |
| 7,520,342 B2 | 4/2009 | Butler et al. | |
| 7,527,736 B2 | 5/2009 | Shafer et al. | |
| 7,608,190 B1 | 10/2009 | Banerjee et al. | |
| 7,681,643 B2 | 3/2010 | Heins | |
| 7,815,804 B2 | 10/2010 | Nagghappan | |
| 7,824,552 B2 | 11/2010 | Slabaugh et al. | |
| 8,052,763 B2 | 11/2011 | Gallot | |
| 8,158,097 B2 | 4/2012 | DiTommaso et al. | |
| 8,535,538 B1* | 9/2013 | Keeling | C02F 9/00 166/266 |
| 8,834,726 B2 | 9/2014 | Keister | |
| 8,877,690 B2* | 11/2014 | Keister | C01D 3/06 210/638 |
| 9,221,697 B2 | 12/2015 | Keister | |
| 9,796,612 B2* | 10/2017 | Ertel | C02F 3/305 |
| 2005/0131086 A1 | 6/2005 | Dancuart Kohler et al. | |
| 2005/0279500 A1 | 12/2005 | Heins | |
| 2006/0138046 A1 | 6/2006 | Stafford | |
| 2007/0051513 A1* | 3/2007 | Heins | E21B 43/24 166/265 |
| 2007/0102154 A1 | 5/2007 | Grott | |
| 2007/0114174 A1 | 5/2007 | Peeters et al. | |
| 2008/0041783 A1 | 2/2008 | Barnes | |
| 2008/0223783 A1 | 9/2008 | Sutton | |
| 2009/0184054 A1 | 7/2009 | Crawford et al. | |
| 2009/0261042 A1 | 10/2009 | Semiat et al. | |
| 2010/0125044 A1 | 5/2010 | Keister | |
| 2010/0218946 A1 | 9/2010 | Symington et al. | |
| 2010/0264080 A1 | 10/2010 | Livingston et al. | |
| 2010/0282654 A1 | 11/2010 | Hauschild | |
| 2011/0104038 A1* | 5/2011 | DiTommaso | C02F 1/048 423/430 |
| 2011/0189469 A1 | 8/2011 | Stenzel et al. | |
| 2013/0048562 A1* | 2/2013 | Keister | C01D 3/06 210/638 |
| 2013/0341268 A1* | 12/2013 | Ertel | C02F 3/305 210/605 |
| 2014/0069821 A1 | 3/2014 | Marcin et al. | |
| 2015/0060368 A1 | 3/2015 | Keister | |

OTHER PUBLICATIONS

Kemmer, Frank N. "Chapter 11: Emulsion Breaking." The NALCO Water Handbook, Second ed., McGraw-Hill Book Company, 1988, pp. 11.1-11.18.

Zurich. "Crystallization." Practica in Process Engineering II, Feb. 6, 2014, www.ethz.ch/content/dam/ethz/special-interest/mavt/process-engineering/separation-processes-laboratory-dam/documents/practica%20in%20process%20engineering%202/crystallization.pdf.

\* cited by examiner

METHOD AND SYSTEM FOR TREATING WASTEWATER

CROSS-REFERENCE TO RELATED APPLICATIONS

This application is a continuation of U.S. utility patent application Ser. No. 14/746,756, titled "Method and System for Treating Wastewater," filed Jun. 22, 2015, which is incorporated by reference herein in its entirety.

FIELD OF THE INVENTION

The present invention relates to methods and systems for processing wastewater. More specifically, the present invention relates to processing wastewater, such as that generated when recovering oil and natural gas, to produce a de-wasted water (water that is no longer considered a residual waste and can be stored in fresh water impoundments) product meeting or exceeding beneficial use criteria, such as the required properties of General Permit WMGR123 (Pennsylvania Department of Environmental Protection, 2012). Further, the present invention relates to producing dry sodium chloride (salt), lithium carbonate and liquid calcium chloride (approximately 20% or approximately 35%) from processed wastewater for beneficial use.

BACKGROUND OF THE INVENTION

Extracting oil and natural gas from unconventional resources, such as shale gas formations, through the combination of horizontal drilling and hydraulic fracturing has increased at a rapid pace in recent years. The Marcellus Shale and Utica Shale are sedimentary formations that underlie most of Pennsylvania and West Virginia and extend into parts of Virginia, Maryland, New York and Ohio. These shale formations are two of several important gas reserves in the United States and together they are one of the largest natural gas "plays" in the world. A "play" is the geographic area underlain by a gas or oil containing geologic formation.

Development of these gas plays and other unconventional resources presents significant potential for economic development and energy independence, but also presents the potential for environmental impacts on land, the water and air. For example, between 10% and 40% of the water used for hydro-fracturing a gas well typically returns to the surface as flowback, or later as produced water. In addition to fracturing fluids added by drillers, this wastewater picks up other contaminants from deep in the Earth.

In some parts of the United States, gas drilling companies typically dispose of wastewater deep in the ground, by using Class II injection wells. However, the geology in some locations, such as in Pennsylvania, does not necessarily allow for deep injections. Although municipal treatment plants previously accepted this wastewater, certain states, such as Pennsylvania, prevent publicly owned wastewater treatment facilities (POTWs) from accepting water that has flowed back after fracturing without a certain level of pretreatment. This restriction is thought to promote the goal of establishing and maintaining a closed loop process for the recycling and reuse of oil and gas liquid wastes. States other than Pennsylvania also restrict the ability of publicly-owned treatment works to accept oil and gas wastewaters.

Recently, a number of states have passed regulations to treat processed wastewater having specific properties as a non-waste product. For example, General Permit WMGR123 (Pennsylvania Department of Environmental Protection, 2012) identifies specific water quality criteria that, if met, will not require wastewater after it is processed to be treated as waste. The specific criteria of Appendix A of WMGR123 are reproduced below in Table 1.

TABLE 1

| General Permit WMGR123, Appendix A Criteria | |
|---|---|
| Property | Limits |
| Aluminum | 0.2 mg/L |
| Ammonia | 2 mg/L |
| Arsenic | 10 µg/L |
| Barium | 2 mg/L |
| Benzene | 0.12 µg/L |
| Beryllium | 4 µg/L |
| Boron | 1.6 mg/L |
| Bromide | 0.1 mg/L |
| Butoxyethanol | 0.7 mg/L |
| Cadmium | 0.16 µg/L |
| Chloride | 25 mg/L |
| COD | 15 mg/L |
| Chromium | 10 µg/L |
| Copper | 5 µg/L |
| Ethylene Glycol | 13 µg/L |
| Gross Alpha | 15 pCi/L |
| Gross Beta | 1,000 pCi/L |
| Iron | 0.3 mg/L |
| Lead | 1.3 µg/L |
| Magnesium | 10 mg/L |
| Manganese | 0.2 mg/L |
| MBAS (Surfactants) | 0.5 mg/L |
| Methanol | 3.5 mg/L |
| Molybdenum | 0.21 mg/L |
| Nickel | 30 µg/L |
| Nitrite-Nitrate Nitrogen | 2 mg/L |
| Oil & Grease | ND |
| pH | 6.5-8.5 SU |
| Radium-226 + Radium-228 | 5 pCi/L |
| Selenium | 4.6 µg/L |
| Silver | 1.2 µg/L |
| Sodium | 25 mg/L |
| Strontium | 4.2 mg/L |
| Sulfate | 25 mg/L |
| Toluene | 0.33 mg/L |
| TDS | 500 mg/L |
| TSS | 45 mg/L |
| Uranium | 30 µg/L |
| Zinc | 65 µg/L |

Accordingly, it is important that public health and the environment are protected as unconventional resource extraction and production activities become a more prominent component of the oil and gas sector. To this end, regulations governing the management of such wastewater have been evolving at the state level, resulting in increased waste management costs for the petroleum industry. Moreover, strict treatment target requirements specified in each state for unrestricted-use water are particularly challenging to meet. In addition, the federal government has also proposed restrictions on receipt of produced waters by POTWs. Aside from the challenges that may be posed by the regulatory levels for certain contaminants, de-wasting wastewaters from oil and natural gas production pose other challenges, including but not limited to the large fluctuation in daily flow rate of the wastewater; the variation in total dissolved solids (TDS) levels; and variable concentrations of emulsified oil and methanol.

There is therefore a need in the art for methods and systems for processing oil and gas wastewater with a goal to reuse the processed water, such as for water used in well fracturing while recovering/generating useable byproducts. It would be especially beneficial if such wastewater could be processed to produce both by-products for beneficial use as well as de-wasted water, i.e. unrestricted-use water that is not classified as a residual waste. The production of marketable by-products would reduce the costs of treatment. The production of de-wasted water would allow for less burdensome storage, transportation, and reuse or the potential direct discharge of the water keeping it in the hydrologic cycle.

SUMMARY OF THE INVENTION

One embodiment of the invention is a method for treating wastewater. The method includes the steps of receiving a wastewater, screening the wastewater to determine the optimal treatment approach, pretreating the wastewater to an acceptable quality for thermal mechanical crystallization/evaporation, preheating a portion of the wastewater, feeding the wastewater into an evaporator circulation loop, passing the wastewater through a heating chest, forming NaCl crystals in an evaporation/crystallization unit, circulating smaller NaCl crystals back to the evaporator circulation loop, and separating larger NaCl crystals out of the evaporation/crystallization unit. The embodiment may be configured such that the heating chest is part of the evaporator circulation loop. The embodiment may also include a step of washing the NaCl crystals with a condensate to generate a substantially pure NaCl. The substantially pure NaCl may be at least 98% pure. The NaCl crystals may be dewatered using a centrifuge or like device.

The embodiment may also include routing centrate/filtrate remaining after the larger NaCl crystals have been separated back to the evaporation/crystallization unit. The centrate/filtrate may be mixed with a portion of the wastewater as it is fed to the evaporation/crystallization unit. Vapor from the evaporation/crystallization unit may be passed through a demister and/or other mechanical device to remove water droplets. The vapor may be compressed after the water droplets have been removed. The compressed vapor may be used to heat the wastewater. Condensate from the process may be used for sealing water and wash water.

The embodiment may also include a screening step to determine if the wastewater has high concentrations of methanol, high concentrations of oil, or low concentrations of total dissolved solids. Once screened, methanol can be removed from wastewater with high concentrations of methanol, total dissolved solids can be concentrated in the wastewater that has low concentrations of total dissolved solids, and oil can be removed from the wastewater with high concentrations of oil. Wastewater high in methanol may be processed in a rectification column, wherein the bottom product from the rectification column is passed to a thermal mechanical distillation/evaporation unit and the methanol from the rectification column is stored in a methanol storage tank. The total dissolved solids can be concentrated using a thermal mechanical distillation/evaporation unit. The oil from wastewater high in oil can be removed by first mixing the wastewater high in oil with an emulsion breaking chemical. Once mixed, the wastewater/emulsion mixture is passed through a centrifuge to break the mixture. Once broken the mixture is allowed separate in a separation tank. The mixture may also be heated to assist in separating the oil from the wastewater.

Wastewater from the evaporation/crystallization unit may comprise a condensate/distilled water and a concentrated mixed brine solution/mother liquor comprising approximately 18 to 20% $CaCl_2$ purge. The condensate/distilled water may be made suitable for unrestricted reuse in the oil and gas industry, discharge to surface water under an NPDES permit, or reuse in the treatment process.

The concentrated brine from the evaporation/crystallization unit may be passed to a cooling tank, where it is available for reuse or further treatment in a second stage thermal mechanical evaporation/crystallization unit to generate a high-purity 35% $CaCl_2$.

Another embodiment may be a system for treating wastewater that includes a wastewater input line for receiving and segregating wastewater for treatment, a system for pretreating wastewater to an acceptable quality for thermal mechanical crystallization/evaporation, a heat exchanger configured to preheat a portion of the pretreated wastewater, an evaporation/crystallization unit configured to receive and evaporate pretreated wastewater, a heating chest, a circulation line configured to recirculate pretreated wastewater from the evaporation/crystallization unit, through the heating chest, and back into the evaporation/crystallization unit, an NaCl washer connected to the evaporation/crystallization unit and configured to spray pretreated wastewater into a settling area of the evaporation/crystallization unit to wash NaCl crystals from the evaporation/crystallization unit, and a centrifuge configured to receive NaCl crystals removed from the evaporation/crystallization unit by the NaCl washer and dewater the NaCl crystals.

The system may also include a demister or other mechanical devices configured to receive vapor from the evaporation/crystallization unit and remove water droplets from the vapor. The system may also include a compression unit configured to receive the vapor from the demister and/or other mechanical devices. The compression unit may include blowers, compressors, or blowers and compressors. The system may also include a circulation route configured to route the vapor from the compression unit to a heat exchanger. In some embodiments, a sealing water holding tank configured to receive the vapor from the compression unit. The system may also include an input for receiving steam from an external source.

The system may also include a system for routing wastewater to a general wastewater stream, a low total dissolved solids stream, a high methanol stream, a high oil content stream, and a high solid materials stream. The low total dissolved solids stream includes a thermal mechanical distillation/evaporation unit configured to receive wastewater low in total dissolved solids and a distillation/evaporation unit output line for receiving distilled water. The high methanol stream includes a rectification column configured to receive wastewater high in methanol and a rectification output line connected to the rectification column for receiving methanol from the rectification column. The high methanol stream may also include a bottom product line connected to the rectification column for receiving wastewater with less methanol than the wastewater high in methanol, and a distillation/evaporation unit connected to the bottom product line for receiving wastewater with less methanol than the wastewater high in methanol. The high methanol stream may also include a distillation/evaporation unit positioned up-stream of the methanol rectification column, wherein the distillation/evaporation unit removes suspended solids from the wastewater. The high oil content stream includes a high oil stream line for receiving the wastewater with a high oil content, a centrifuge for emulsion breaking, a gravity separation tank for receiving an oil water mixture from the centrifuge, and a heated separation tank connected to the gravity separation tank.

Another embodiment may be a method for treating $CaCl_2$ including the steps of receiving a fluid comprising approximately 20% $CaCl_2$, recovering lithium carbonate from the fluid, and processing the fluid through a second stage thermal mechanical evaporation/crystallization unit, wherein the second stage thermal mechanical evaporation/crystallization unit is configured to generate high-purity approximately 35% $CaCl_2$, distilled water and a mixed brine reject stream.

DETAILED DESCRIPTION OF THE EXEMPLARY EMBODIMENTS

The present invention provides methods and systems for producing beneficial by-products and "de-wasted" water from oil and gas liquid wastewater. "De-wasted" water is water with concentrations of contaminants below regulatory-established criteria for the contaminants, such as the criteria of General Permit WMGR123, Appendix A (Pennsylvania Department of Environmental Protection, 2012), provided in Table 1 above. The systems and processes described herein may be employed to process wastewater containing contaminants, such as but not limited to, high total suspended solids (TSS), ammonia, nitrates/nitrites, chemical additives, high total dissolved solids (TDS), metals, and/or technically enhanced naturally occurring radioactive materials (TENORM). For example, the treatment methods may be employed to treat nearly any type of oil and gas wastewater, including but not limited to top-hole wastewater, pit wastewater, spent drilling fluids, flowback from hydraulic fracturing, produced wastewater, gathering line wastewater and compressor station wastewaters.

Figure 1A:
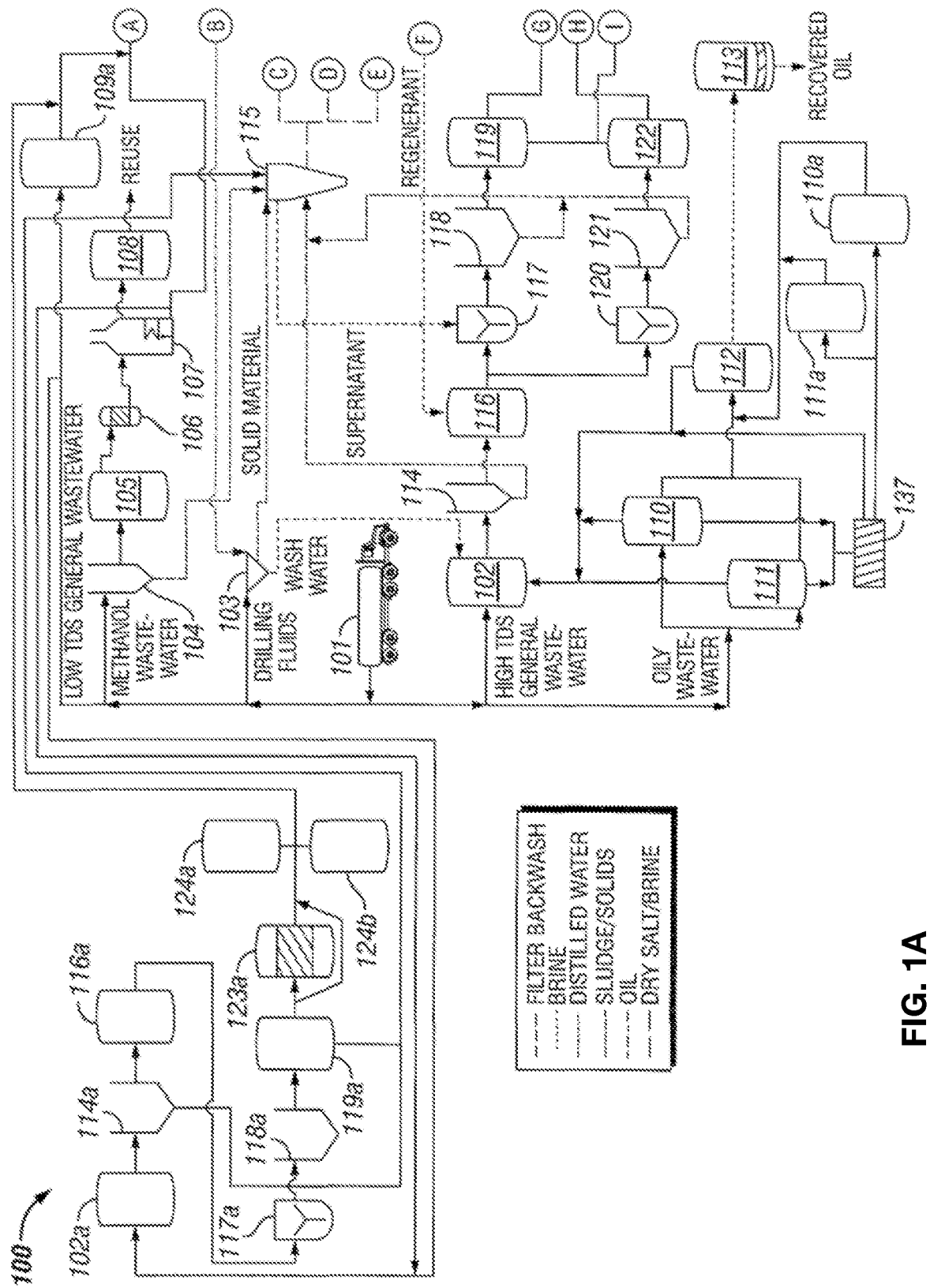
FIGS. 1A and B provide a schematic diagram of a wastewater treatment system in accordance with an exemplary embodiment of the present invention.

FIGS. 1A and B provide a schematic diagram of a wastewater treatment process 100 in accordance with an exemplary embodiment of the present invention. Referring to FIGS. 1A and B, many aspects of the depicted process may be modified or altered to produce a distilled water product from wastewater from oil or natural gas production. The process shown is exemplary and is intended to show broadly the relationship between the various aspects of the wastewater treatment processes 100. As shown, incoming wastewater is transported from an oil or gas well site and/or associated infrastructure. For example, oil and gas wastewater may include liquid wastes from the drilling, development and/or operation of oil and gas wells and/or collection systems and facilities. In this exemplary process, the wastewater may be transported by a tanker 101. In other embodiments it may be delivered to the treatment facility by pumps and/or pipelines connected directly or indirectly to a wastewater source. Wastewater from tanker 101 is routed according to its expected composition. A wastewater profile form is established for each type of wastewater brought to the facility. The profile forms provide operations staff with the qualitative and quantitative characteristics of the wastewater that may be brought to the facility, along with miscellaneous generator information. All wastewater profile report forms are kept on file at the facility. Before any raw, untreated liquid waste is unloaded into the partially below grade concrete receiving water storage tanks, it is first evaluated/screened by operators. The water is evaluated and screened using a collection of methods to regulate incoming waste loads. These methods are focused on determining if the incoming material is treatable at the facility and to allow for rejection of material that the facility is not allowed to accept per the permits that are in place for that facility. The water is tested for a set of parameters, including total dissolved solids (TDS)/conductivity, pH, temperature, sulfate, barium, specific gravity, settleable solids, methanol content, radiation exposure rate, as well as visual inspection for oil and other additives. If it passes the preliminary characterization and visual inspection screening, the truck may be unloaded into one of the four concrete receiving water storage tanks or directly to one of the holding tanks at the direction of operators. In the exemplary embodiment of FIGS. 1A and B, the wastewater screening is used to determine the optimal treatment process. For example, wastewater considered general wastewater—wastewater that does not have high concentrations of oil or methanol—may be routed directly to raw water storage tanks 102. Raw water storage tanks 102 are sized to hold wastewater until it is processed. The timing of the process depends on a number of factors, such as amount of wastewater and output demands. Drilling fluids may also be routed to screening and washing pits 103 when they have a high concentration of suspended solids or in another embodiment directly to sludge storage tanks 115. Wastewater from screening and washing pits 103 is then routed to raw water storage tanks 102. Sludge and solids separated from wastewater at screening and washing pits 103 are routed to sludge storage tanks 115 for further processing.

Incoming wastewater may also be routed for methanol (MeOH) treatment when it contains an elevated concentration of methanol. For purposes of the preferred embodiment discloses in FIGS. 1A and B, wastewater is considered to have an elevated concentration of methanol when it has a methanol concentration greater than 500 mg/L (methanol containing). For methanol treatment, the wastewater is processed through primary settling clarifier 104. Once the solids present in the wastewater are allowed to settle, it may be transferred to methanol storage holding tanks 105. The methanol wastewater may also be sent through pretreatment prior to being sent to the methanol storage holding tanks 105.

From methanol storage holding tanks 105, methanol containing wastewater is passed through cartridge filter 106 to remove residual suspended solids. From cartridge filter 106, wastewater is then routed to rectification column 107. Bottom product from rectification column 107, which consists of wastewater mostly free of methanol, is routed to a mechanical vapor recompression (MVR) distillation or other thermal mechanical distillation/evaporation unit 109b for further processing. The methanol from the rectification column is routed to methanol storage tank 108, where it is available for beneficial reuse. In another embodiment, the methanol wastewater may be put through pretreatment and thermal mechanical distillation/evaporation prior to the rectification column 107.

Wastewater that contains appreciable quantities of oil or oil skimmed from various storage tanks may be treated in an oil processing system to remove the oil before further processing. In the embodiment shown, the oily wastewater is routed to one of two gravity separation tanks, 110 or 111, where it is allowed to naturally separate. Wastewater that is mostly free of oil is routed from the gravity separation tanks, 110 or 111, to wastewater receiving tanks 102. Wastewater that still has a significant amount of oil is routed to heated tank 112, where it is heated. Optimally, the wastewater in heated tank 112 is maintained at approximately 140 to 150 degrees Fahrenheit. However, other temperatures may also be used. Once heated, the oily wastewater is allowed to naturally separate. The wastewater that is mostly free of oil is routed from heated tank 112 to wastewater receiving tank 102. The recovered oil may then be routed to recovered oil tank 113. The recovered oil in tank 113 is shipped off-site for other uses including energy recovery. In another embodiment, wastewater containing oil may be treated with emulsion breaking chemicals and processed through a centrifuge 137 prior to being introduced to gravity separation tanks 110a and 111a.

Produced and flowback wastewater from receiving tank 102 passes through one or more primary settling clarifiers 114 and raw water storage tanks 116 before being routed to a first pretreatment train (items 117, 118, and 119) or second pretreatment train (items 120, 121, and 122) operated in series or in parallel. In the pretreatment trains, some combination of one or more chemicals (sodium sulfate, lime, soda ash, ferric chloride) are added to precipitate metals and the pH of the wastewater is adjusted (using caustic and/or hydrochloric acid) in pH adjustment/chemical addition tanks 117/120 to optimize pretreatment. Once the chemicals are added and pH is adjusted, the wastewater passes through a flocculation tank where polymer is added to promote precipitation and then on to a secondary clarifier (circular or lamella clarifiers may be used) 118/121 before being sent to a final equalization tank 119/122. Chemical dosages are continuously adjusted to achieve pretreated water quality that optimizes the opportunities for beneficial use of by-products and the performance of subsequent treatment processes.

Generally, solids entrained in the wastewater are removed from the wastewater at the screen washing pit 103 or any of the primary settling clarifiers 114, or any of the secondary circular or lamella clarifiers 118/121. The solids are sent to sludge storage tanks 115. The thickened sludge is then passed through a filter press 113a, a rotary press 113b, centrifuge 113c or other dewatering process, before it is transported to a landfill for disposal. The liquid removed from the solids in sludge thickening tanks 115 (or other steps in the dewatering process) may be recycled to the beginning of the first and/or second pretreatment trains. Alternatively, the water removed during the sludge dewatering process may be routed to receiving tanks 102.

In one embodiment, wastewater that is low in TDS (typically less than 150,000 mg/L) may be routed to a dedicated low TDS pretreatment train. In this embodiment, low TDS wastewater may be stored in receiving tank 102a. The low TDS wastewater may be passed through one or more primary settling clarifiers 114a and raw water storage tanks 116a before being routed to pH adjustment/chemical addition tanks 117a, a secondary clarifier 118a, and a final equalization tank 119a, as discussed above. As can be seen in FIGS. 1A and B, the pretreated low TDS wastewater may be routed to distillation/evaporation feed tanks 109a and then on to a thermal mechanical distillation/evaporation unit 109b, such as but not limited to a NOMAD evaporator. Distilled water from thermal mechanical distillation/evaporation unit 109b is routed to a distilled water storage tank 127. Brine from the thermal mechanical distillation/evaporation unit 109b is routed to pretreated water storage tanks 124c, 124d. In another embodiment, the low TDS wastewater may be routed past the pretreatment stage directly to thermal mechanical distillation/evaporation feed tanks 109a and then on to thermal mechanical distillation/evaporation unit 109b for further processing.

Once the wastewater is passed through one of the pretreatment trains described above, it may be referred to as "pretreated water" and may be sent to a pretreated water polishing treatment 123, 123a. Water polishing treatment 123, 123a treats the pretreated water using an ion exchange system, ultrafiltration system, or other known methods. The ultrafiltration system may apply hydrostatic pressure to force the pretreated water through semipermeable membranes. Suspended solids are retained in the membrane, while the wastewater passes through the membrane. In another embodiment, the pH of the wastewater may be sequentially adjusted using acid addition to promote carbonate removal and reduce scale formation potential followed by caustic addition to obtain the optimum pH for further treatment. Pretreated water passing through water polishing treatment 123, 123a is then stored in pretreated water storage tanks. In the embodiment shown, the pretreated water is stored in storage tanks according to TDS. Low TDS (typically less than 150,000 mg/L) can be stored in interior storage tanks 124a or exterior storage tanks 124b. High TDS (greater than 150,000 mg/L) can be stored in interior storage tanks 124c or exterior storage tanks 124d. Alternatively, depending on the system demands, some or all of the pretreated water may be passed from water polishing treatment 123 back to an earlier point in the process. In the embodiment shown, the pretreated water is passed back to raw water storage tank 116. The amount of water routed to an earlier point in the process depends in part on the solids content of the incoming wastewater. For example, wastewater high in suspended solids may need to be wetted with raw wastewater (low in suspended solids) or pretreated water to allow conveyance of the wastewater in an optimal manner. Water in pretreated water storage tanks may be further processed or made available for beneficial reuse. Pretreated water may be segregated based on TDS concentration.

The pretreated water passes from water storage tanks 124c, 124d through pipe 133 to an evaporation/crystallization unit 125, such as but not limited to an MVR crystallizer to produce "distilled water" (sometimes referred to as "condensate"), salt (sodium chloride—NaCl) and concentrated calcium chloride ($CaCl_2$) brine. Wash water from distilled water tank 127 is also supplied to the evaporation/crystallization unit 125 by way of pipe 134. In certain embodiments, the evaporation/crystallization unit 125 is an MVR crystallizer. Distilled water produced in the evaporation/crystallization unit 125 is stored in a distilled water tank 127. Concentrated (approximately 20%) calcium chloride brine purge from the evaporation/crystallization unit 125 is routed to concentrated brine holding tank 136. Dry salt removed by the evaporation/crystallization unit 125 may be made available for beneficial use. Dry in this context means less than 3% moisture. An embodiment of the evaporation/crystallization unit 125 is described in more detail in FIGS. 6A and B.

Salt that precipitates from the calcium chloride brine in the brine holding tank 136 is pumped as slurry back to one of the pretreated water holding tanks, or to one of the raw water holding tanks where it dissolves allowing recycle back to the evaporation/crystallization unit 125.

In another embodiment, the approximately 20% calcium chloride brine may be processed through a lithium recovery process prior to reuse, disposal or further processing.

Brine from concentrated brine holding tank 136 may also be routed to a second stage thermal mechanical evaporation/crystallization unit 126 to produce a more concentrated calcium chloride (approximately 35%), distilled water and solid crystals (primarily barium, strontium and sodium chloride). The second stage thermal mechanical evaporation/crystallization unit 126, in certain embodiments is a circulation type cooling crystallizer. Distilled water from the second stage thermal mechanical evaporation/crystallization unit 126 is routed to distilled water storage 127 via pipe 135. Solid crystals from the second stage thermal mechanical evaporation/crystallization unit 126 may be directed to a landfill for disposal. Liquid $CaCl_2$ may be routed for direct beneficial use or dried further to make calcium chloride pills for beneficial use.

As described in greater detail below, in connection with FIG. 2, the distilled water is passed to a de-wasting system 128 to make the distilled water suitable for unrestricted use or direct discharge. In the embodiment shown, the de-wasting system 128 includes an anoxic and aerobic treatment system 129, a membrane separation system 130, an ion exchange system 131, and a reverse osmosis (RO) system 132.

As shown, in certain embodiments, a concentrated brine purge holding tank 136 may be employed along with evaporation/crystallization unit 125. In the embodiment shown, evaporation/crystallization unit 125 is fed pretreated wastewater to generate sodium chloride, distilled water and concentrated calcium chloride (approximately 20%) brine purge. As noted above, the distilled water produced in evaporation/crystallization unit 125 is stored in the distilled water tank 127, and purge produced in the evaporation/crystallization unit 125 flows through a cooling tank and is then stored in the concentrated brine holding tank 136 and then recycled for use in drilling, development and/or operation of oil and gas wells, or fed to a second stage the second stage thermal mechanical evaporation/crystallization unit 126 to generate more distilled water, solid crystals (primarily barium, strontium and sodium chloride) and more concentrated high-purity calcium chloride (approximately 35%) solution. As an alternative, the approximate 20% calcium chloride brine purge may be augmented by addition of dry calcium chloride to bring it to approximately 35% without additional evaporation/crystallization. The approximately 35% calcium chloride solution may be recycled for use in drilling, development and/or operation of oil and gas wells or used in other commercial/industrial activities.

In another embodiment, the approximately 20% calcium chloride may be processed through a lithium recovery process prior to being reused, further processed or augmented.

Although distilled water produced by the above described process may be reused in drilling, development and/or operation of oil and gas wells without further processing, it typically must still be treated as a waste product. In Pennsylvania, such waste must be stored in impoundments, tanks or containers that meet residual waste requirements prior to future use as makeup water for hydraulic fracturing or other oil and gas well development activities. Accordingly, storage, transport, and reuse of such a material may be burdensome and costly as compared to a non-waste product. Further processing must be done to "de-waste" the water.

As shown in Table 2, below, distilled water produced by processing wastewater through a system similar to the system illustrated in FIGS. 1A and B, may not meet each of the criteria for a de-wasted water product, such as the criteria listed in Table 1 which represent de-wasted water criteria for Pennsylvania.

TABLE 2

Summary of Distilled Water Characteristics

|  | Flow (MGD) | pH | Alkalinity (mg/L $CaCO_3$) | TDS (mg/L) | TSS (mg/L) | COD (mg/L) | CBOD5 (mg/L) | Total Nitrogen (mg/L) | Ammonia NH3—N (mg/L) | Nitrite/ Nitrate, NOx—N (m/L) |
|---|---|---|---|---|---|---|---|---|---|---|
| Average | 0.04 | 10.2 | 139 | 50 | 7 | 1257 | 439 | 47 | 31.9 | 0.25 |
| Min. | 0.002 | 8.1 | 134 | 6 | 5 | 211 | 86 | 26 | 7.3 | 0.25 |
| 5% | 0.006 | 9.7 | 135 | 13 | 5 | 234 | 112 | 30 | 15.2 | 0.25 |
| 25% | 0.015 | 10.0 | 137 | 21 | 5 | 363 | 222 | 37 | 24.6 | 0.25 |
| 50% | 0.035 | 10.2 | 139 | 39 | 5 | 738 | 306 | 46 | 32.8 | 0.25 |
| 75% | 0.051 | 10.4 | 142 | 75 | 6 | 1628 | 552 | 55 | 37.7 | 0.25 |
| 95% | 0.095 | 10.6 | 144 | 121 | 14 | 3404 | 958 | 63 | 55.1 | 0.25 |
| Max | 0.119 | 10.7 | 144 | 138 | 31 | 7900 | 1220 | 90 | 59.4 | 0.56 |

As shown in Table 2, the content of organic compounds in the water, as shown by the chemical oxygen demand (COD) value, are of particular importance, as the values in Table 2 greatly exceed the limit for COD shown in Table 1. Organic compound concentrations may be determined by COD and/or biological oxygen demand (BOD) values, which indicates the mass of oxygen consumed per liter of solution. Another important contaminate when evaluating the distilled water against de-wasted water criteria is nitrogen series contaminants, including ammonia ($NH_3$), nitrite, and/or nitrate.

Generally, ammonia, COD, and BOD concentrations in the distilled water produced from pretreating and distilling wastewater from oil and natural gas operations as shown in FIGS. 1A and B may be present at levels similar to domestic sewage. The median ratio of $CBOD_5$ to COD as shown in Table 2 is about 0.5, which may be indicative of a fairly biodegradable wastewater. Moreover, the COD may consist of low molecular weight organics and/or volatile organic compounds, as the organic materials passed through the water polishing treatment 123.

The ammonia and total nitrogen concentrations of the distilled water may also be similar to domestic wastewater. As shown in Table 2, the total nitrogen levels of a distilled water product produced from pretreating and distilling wastewater from oil and natural gas operations may range from about 20% to about 90% higher than ammonia levels. Because the nitrate/nitrite levels are shown to be low (e.g., about 0.25 mg/L), the total nitrogen and ammonia likely represent an organic nitrogen fraction, which may or may not be biodegradable.

Figure 2:
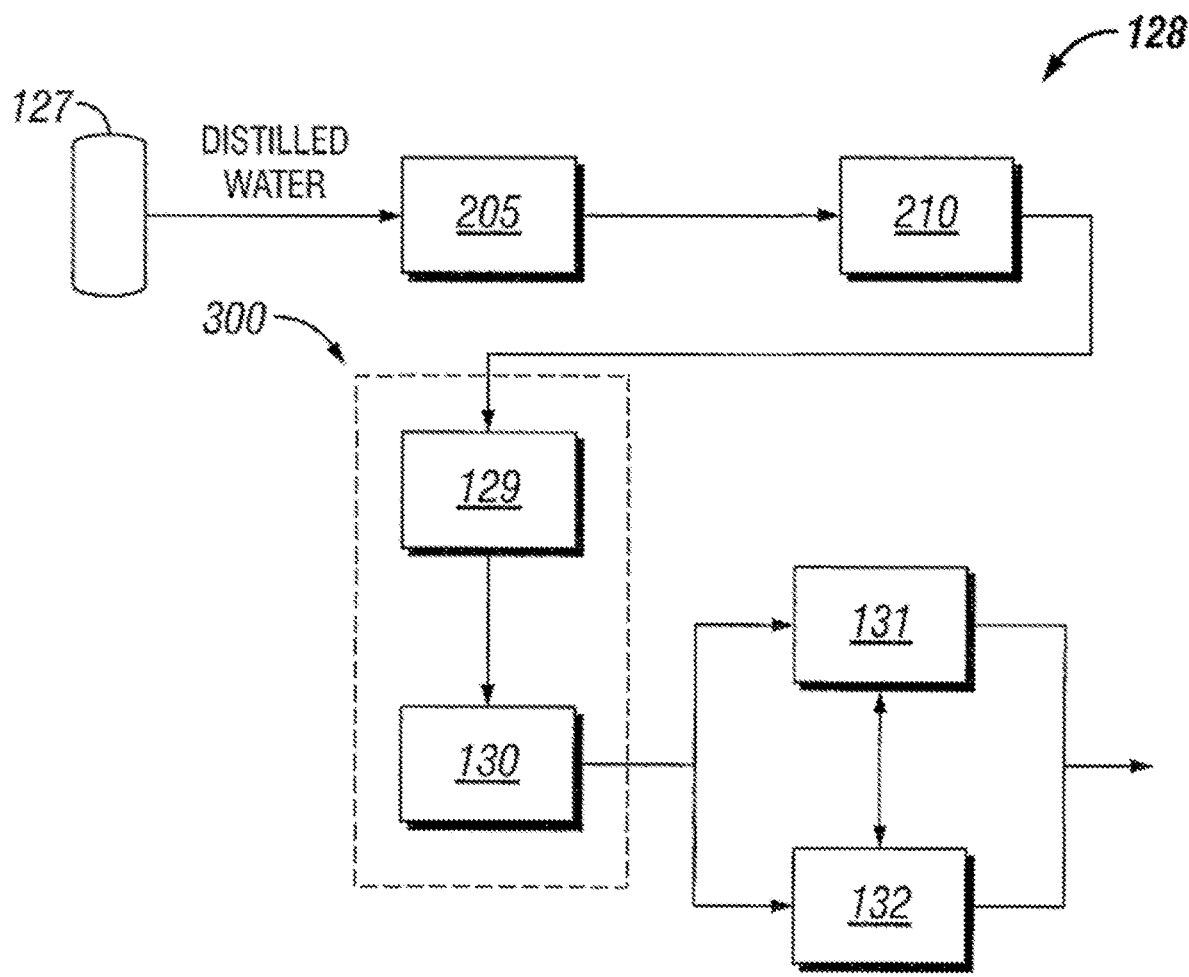
FIG. 2 provides a block diagram of a wastewater treatment system following pretreating and distilling wastewater in accordance with an exemplary embodiment of the present invention.

FIG. 2 provides a block diagram of a de-wasting system 128 following pretreating and distilling wastewater in accordance with an exemplary embodiment of the present invention. The illustrated system is capable of producing de-wasted water meeting or exceeding each of the characteristics of a typical regulatory regime for de-wasted water, such as Pennsylvania's WMGR123. Such a system solves many of the problems of de-wasting distilled water, including but not limited to the similar density of oil, mud and water; large fluctuation in daily flow rate; and high concentrations of emulsified oil.

Figure 1B:
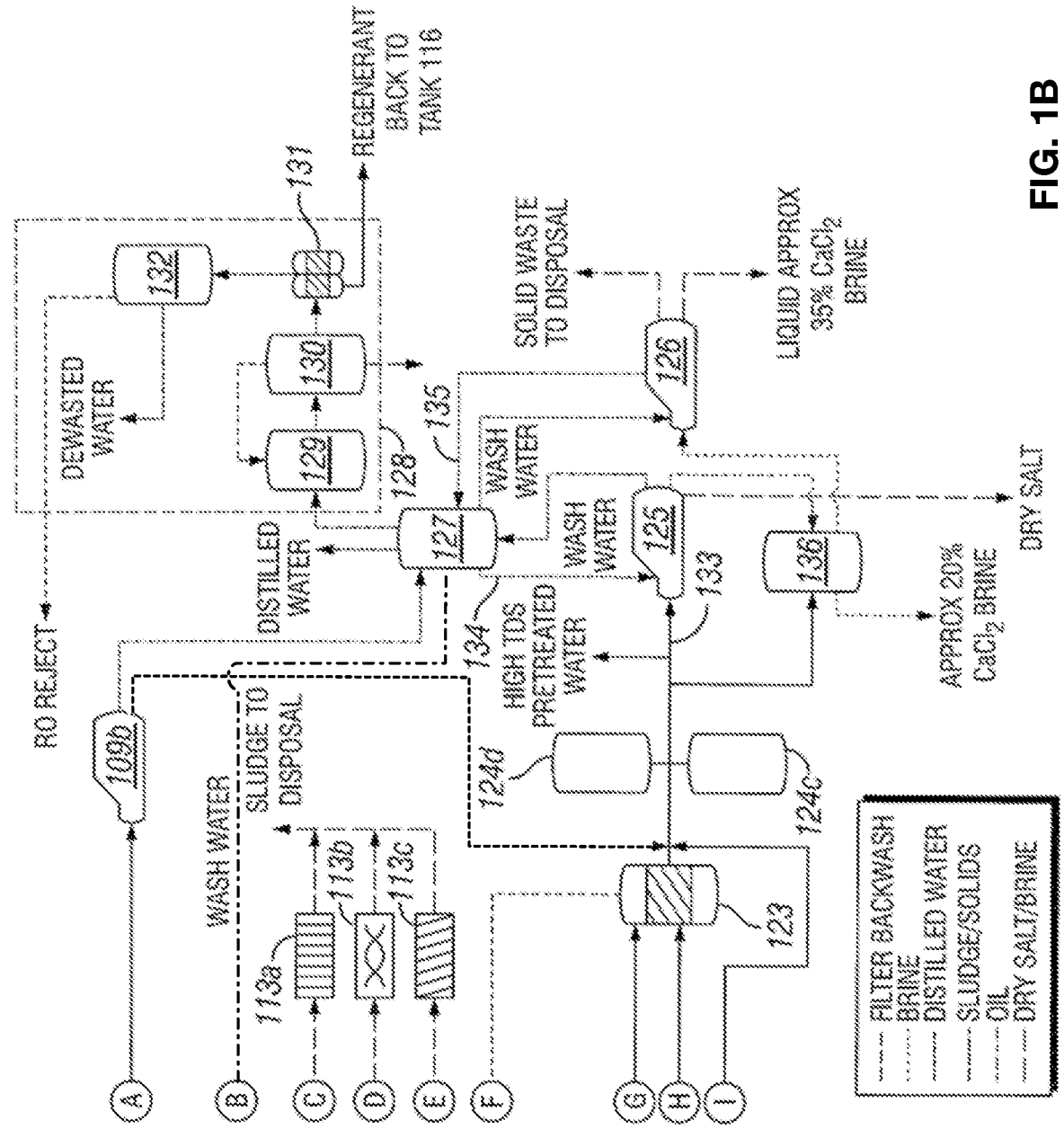

Referring to FIGS. 1A, 1B and FIG. 2, distilled water, such as water stored in the distilled water tank 127, passes into a temperature control unit 205 (not shown in FIG. 1A or B), such as a heating or cooling system. The temperature of the influent distilled water is preferably between 20° C. to 35° C. for the present invention to adequately treat the water. One or more temperature control units 205 are employed to either heat or cool the water to a temperature within the preferred range. Water temperature instrumentation determines the water temperature of the inlet and outlet water from the temperature control units 205.

Once the temperature of the influent distilled water is within an acceptable range, the water may be passed through a pre-filter 210, such as but not limited to a basket strainer or the like. The pre-filter 210 removes particles from the water having a size of greater than about ¹⁄₂₀ inch, greater than about ¹⁄₁₆ inch, greater than about ⅛ inch, or greater than about ¼ inch. Solids collected in the pre-filter 210 (or generated in subsequent processes described below) may be managed in accordance with applicable residual waste regulations.

The distilled water passes from the pre-filter 210 to a biological treatment system 300. The biological treatment system 300 comprise an anoxic and aerobic treatment system 129 and a membrane separation system 130. As shown, distilled water is passed from the pre-filter 210 to the anoxic and aerobic treatment system 129, which comprises one or more anoxic reactor tanks and aerobic reactor tanks to remove COD/BOD and nitrogen. Following treatment in the anoxic and aerobic treatment system 129, the treated water moves to a membrane separation system 130 comprising one or more membrane separation tanks. The anoxic and aerobic treatment system 129 and membrane separation system 130 of the biological treatment system 300 are described in greater detail in connection with FIG. 3, below. Following processing in the anoxic and aerobic treatment system 129 and the membrane separation system 130, the processed water stream is further treated in either an ion exchange system 131 or a reverse osmosis system 132. Alternatively, as shown in the embodiment of FIGS. 1A and B, the processed water stream may be treated by the ion exchange system 131, reverse osmosis system 132, or both. The ion exchange system 131 and reverse osmosis system 132 are described in greater detail below in connection with FIGS. 4 and 5, respectively.

Figure 3:
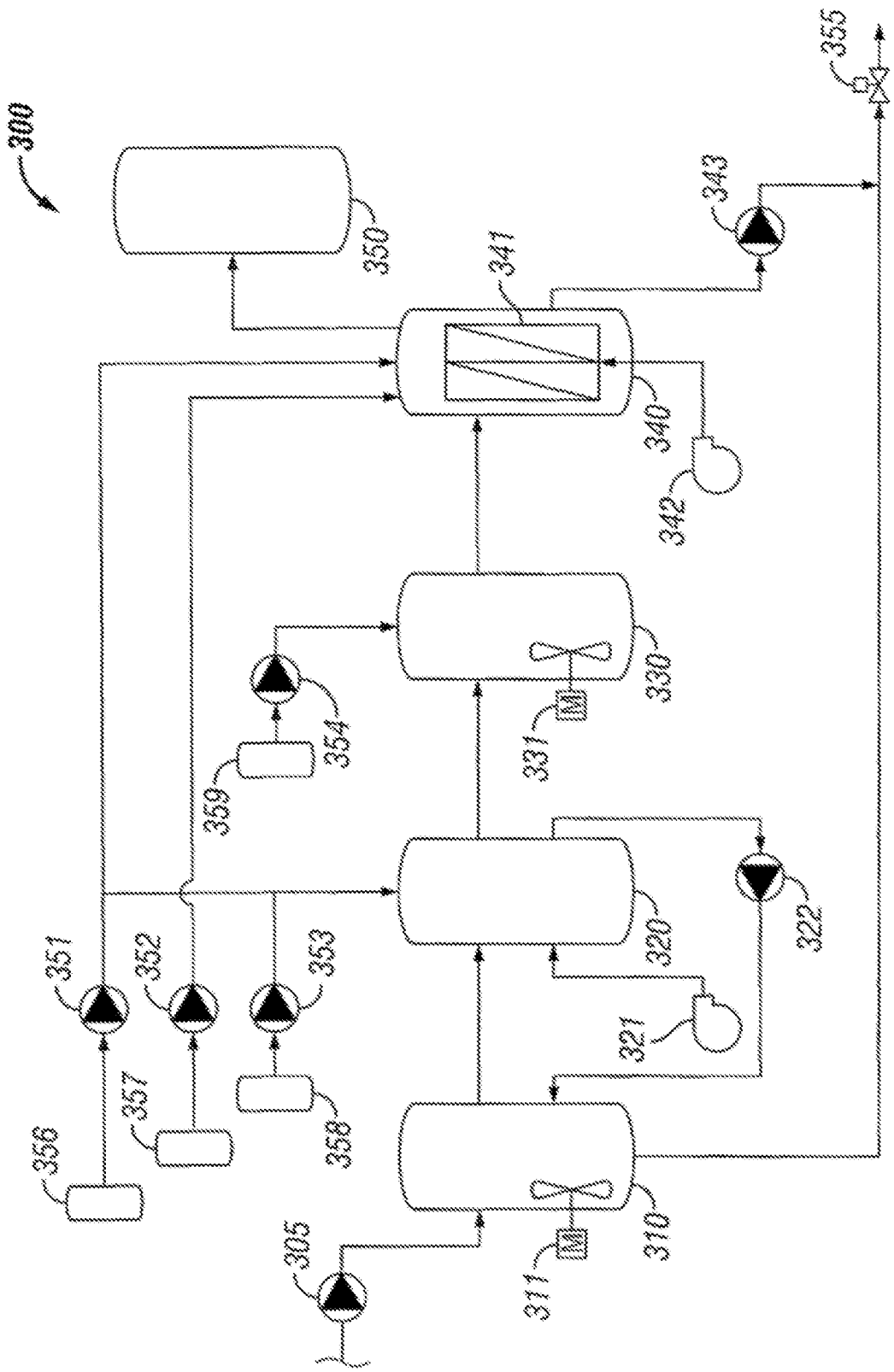
FIG. 3 provides a schematic diagram of a biological treatment system 300 including an anoxic and aerobic treatment system and a membrane separation system in accordance with an exemplary embodiment of the present invention.

FIG. 3 provides a schematic diagram of a biological treatment system 300 including an aerobic and anoxic treatment system (FIG. 2 at 129) comprising a pre-anoxic tank 310, an aeration tank 320 and a post-anoxic tank 320; and a membrane separation system (FIG. 2 at 130) comprising a membrane bioreactor 340. Referring to FIGS. 1A and B, 2, and 3, a liquid water stream, such as the distilled water stored in the distilled water tank 127, enters a pre-anoxic tank 310 from the pre-filter 210 through pump 305, where a denitrification reaction occurs. Denitrification is a microbial process where nitrate ($NO_3^-$) is converted to nitrite ($NO_2^-$), which is converted to nitric oxide and nitrous oxide ($NO+N_2O$), which is converted to nitrogen gas ($N_2$). The liquid water stream is added to the pre-anoxic tank 310 in a continuous process.

The pre-anoxic tank 310 is "seeded" with biological material that includes bacteria. The bacteria (e.g., heterotrophic bacteria) in the pre-anoxic tank 310 convert any nitrate compounds in the wastewater to nitrogen gas, which is released into the atmosphere. Although denitrification releases nitrogen from the water, oxygen released in the process stays dissolved in the water, which reduces the oxygen input needed for the system in the next step of the process. The source of the biological material is sludge from a sewage processing plant, typically referred to as "activated sludge." Activated sludge includes sludge particles produced in waste treatment by the growth of organisms in aeration tanks, such as in a sewage treatment plant. The sludge is "activated" because the sludge includes living material such as bacteria, fungi, and protozoa. These living materials are used in the denitrification reaction. This seed step occurs once, to seed the tank. Then, additional bacteria is grown as part of the COD degradation process. In some cases, all of the bacteria in the system may die. In that case, the system must be re-seeded.

In the embodiment of FIG. 3, the pre-anoxic tank 310 includes a submersible mix pump 311 for mixing the tank contents. Optionally, additives such as but not limited to phosphorous may be added to the pre-anoxic tank 310. Phosphorus is an essential nutrient required for biological treatment which is missing in the wastewater. For example, phosphorus, in the form of phosphoric acid stored in tank 358 is added, through pump 353, as needed to the influent of pre-anoxic tank 310. Typically, a dissolved oxygen level in the anoxic tank may be from about greater than 1.0 mg/L and the temperature in the pre-anoxic tank 310 range from about 20° C. to about 35° C. An industrial scale pre-anoxic tank may be about 10,000 gallons of capacity, without limitation.

The distilled water being processed in the biological treatment system 300 passes from the pre-anoxic tank 310 to an aeration tank 320 such that nitrogen compounds (e.g., $NH_3$, $NO_{2)}$ are nitrified by nitrifying bacteria. Nitrification is the oxidation of ammonia with oxygen into nitrite followed by the oxidation of these nitrites into nitrates by biological mechanisms, such as by bacteria or other micro-organisms. Under aerobic conditions, biological organisms (e.g., ammonia oxidizing bacteria and/or nitrite oxidizing bacteria) added in the pre-anoxic tank 310 and remaining in the water that passes to the aeration tank 320 oxidize nitrogen compounds to nitrite and nitrate compounds.

Oxygen is added to the aeration tank 320, for example by employing compressors and/or diffusers or by high purity oxygen and mechanical surface aeration. As shown in FIG. 3, an air pump 321 delivers air into the aeration tank 320, and a pocket of compressed air forms in the top of the aeration tank 320. As water enters the tank from the pre-anoxic tank 310, it passes through the air pocket. For example, the aeration tank 320 may contain a baffle or other structure, such that water sprays down through the pocket of compressed air. Moreover, water may be further aerated in the tank through a riser or the like (not shown). For example, coarse bubble diffusers may be submerged in the tank liquid and provide air to the aeration tank 320.

An industrial scale version aeration tank 320 may be from about 50,000 to about 75,000 gallons, without limitation. The tank may include a vent system (not shown) to release gases that form in the tank and to provide for a turnover of air in the tank. The pump 321 and vent may be controlled by the same electrical circuit such that vent may open when the pump 321 is running, and the vent may close when the pump is turned off. Moreover, the pump 321 and vent circuitry may be in electrical communication with a pressure gauge so that they may be automatically operated based on the pressure within the tank. In other embodiments, the pump 321 and vent circuitry may be in communication with a flow switch, which turns the pump/vent system on when water is flowing.

As shown, any number of chemicals may be added to the aeration tank 320. Bacteria macronutrients, such as but not limited to phosphorous, may be added at any point in the anoxic/aerobic biological treatment system. For example, phosphorus, in the form of phosphoric acid stored in tank 358 is added, through pump 353, as needed, to aeration tank 320.

Micronutrients may be added by directing, for example, boiler or cooling tower blow-down to the system along with a source of alkalinity (e.g., NaOH) for pH control, as nitrification consumes alkalinity. The alkalinity source may be KOH, instead of or in addition to NaOH in certain embodiments, due to the very low $Cl^-$ and $Na^+$ limits for de-wasting water in some regulatory regimes, such as the limits shown in Table 1. For example, boiling or cooling tower blow-down from the temperature control unit 205 with added NaOH or KOH is stored in tank 357 and added by pump 352. Typically, antifoam agent addition may be needed to control foaming, depending on the characteristics of the distilled water. Accordingly, an antifoam agent stored in tank 356 may be added to the aeration tank 320 by pump 351.

Nitrate may be recycled to the pre-anoxic tank 310 from the aeration tank 320 through a dedicated recycle pump 322 or the like. In this way, the oxygen requirement of the waste in the pre-anoxic tank 310 is met by the release of oxygen from nitrates in the recycled flow.

The treated distilled water passes from the aeration tank 320 to a post-anoxic tank 330, where residual nitrate (e.g., from about 3 to about 10 mg/L) is removed by microbial action. In some cases, the carbon concentration in the water may be insufficient to support this microbial action. In those cases, carbon is added from dosing the post-anoxic tank 330 with a supplemental carbon source, such as ethanol, which is stored in tank 359 and delivered by pump 354. The use of a supplemental carbon source may not be necessary in all cases. Such a source may be employed due to low BOD/COD levels in the treated water. The amount of added carbon varies with the design influent loading, which can vary from system to system. The amount of carbon in the system should be sufficient to maintain bacterial growth, such as to prevent the bacteria from dying off and requiring the system to be re-seeded.

Denitrification requires a carbon source to take place. Although sufficient carbon may be available in the distilled water entering the pre-anoxic tank 310, the BOD:N ratio of the material entering the post-anoxic tank 330 may be insufficient to allow for adequate denitrification. Accordingly, an external source of carbon (e.g., methanol, ethanol, etc.) may be added to the post-anoxic tank 330 to increase the BOD:N ratio. Such addition may occur by way of a carbon dosing pump or other means. The amount of added carbon must be carefully controlled, as too much added carbon introduces an unacceptable BOD into the effluent, while too little leaves some nitrates under-nitrified. Process measurements, such as flow and COD loading, are taken to determine the amount of carbon to be added.

The post-anoxic tank 330 may include the same or similar properties as the pre-anoxic tank 310. For example, an industrial scale post-anoxic tank may be about 10,000 gallons, without limitation. Moreover, the post-anoxic tank 330 may include a submersible mix pump 331 for mixing of the tank contents.

It has been found that the particular arrangement of the pre-anoxic tank 310, aeration tank 320, and post-anoxic tank 330 is beneficial, as the pre-anoxic tank 310 has the advantage of a higher denitrification rate while the nitrates remaining in the liquor passing out of the pre-anoxic tank 310 can be denitrified further in the post-anoxic tank 330 through endogenous respiration. However, other arrangements of anoxic/aerobic tanks may be employed as desired or required. For example, any number of aeration and anoxic tanks may be employed, and the order of such tanks may be rearranged. In one alternative embodiment, the post-anoxic tank 330 may be omitted. In that embodiment, treated water moves from the aeration tank 320 to the membrane separation system (FIG. 2 at 130) (discussed below).

A membrane separation system 130 (e.g., employing a membrane bioreactor 340 or the like) is employed to reduce both BOD/COD and nitrogen from the treated water that passed through the anoxic and aerobic treatment system 129 (that is, through tanks 310, 320, and 330). Suspended bacteria and other particulate solids (i.e., mixed liquor) may be removed from the treated water using a membrane separation system 130. There are many different options for a membrane separation system 130 design, but a micro or ultrafiltration membrane bioreactor ("MBR") 340 is preferred to separate solids from treated effluent. Also, most of the COD in the water is removed through microbial action in the MBR 340. An exemplary MBR 340 includes a submerged membrane 341.

In one specific embodiment, the MBR 340 includes a hollow-fiber membrane having fibers held in modular cassettes that are immersed directly into a liquid. Each cassette includes a permeate header that is connected to the suction side of a reversible rotary lob pump, which applies a low-pressure vacuum to draw treated effluent through the microscopic pores of the fibers in an outside-in flow path. This approach may minimize energy demands and prevent particles from fouling and plugging inside the membrane fiber. One particular MBR thought to be useful in the processes described herein is a Z-MOD™-L MBR manufactured by GE Water & Process Technologies. The Z-MOD™-L MBR includes a ZEEWEED® 500 membrane.

The MBR 340 includes the membrane cassette 341 and tank internals, membrane air scour blower 342, mixed liquor recycle pump 343, permeate pumps, chemical feed systems, a main control panel, and/or other instrumentation. The system may be scalable such that cassettes may be added or removed as necessary.

The MBR 340 may have bacteria macronutrients, such as but not limited to phosphorous, added thereto. Micronutrients may be added by directing boiler or cooling tower blow-down to the system along with a source of alkalinity for pH control (nitrification consumes alkalinity). Generally, antifoam addition may be needed to control foaming, depending on the characteristics of the distilled water. For example, boiling or cooling tower blow-down from the temperature control unit 205 with added NaOH or KOH is stored in tank 357 and added by pump 352. An antifoam agent stored in tank 356 may be added to the MBR 340 by pump 351.

Different scouring and cleaning systems may also be employed to keep the membranes 341 of the MBR 340 clean depending on the system design. For example, in a submerged membrane design, the membrane may be cleaned using an air scour system 342. In certain embodiments, the MBR 340 may be cleaned in place using caustic and/or citric acid solutions. Accordingly, parallel membrane tanks may be provided such that one tank can be taken offline for cleaning without stopping treatment.

As shown, mixed liquor may be recycled from the MBR 340 to the pre-anoxic tank 310 by way of the mixed liquor recycle pump 343. The recycled material may be referred to as return activated sludge (RAS) and may be recycled to the pre-anoxic tank 310 to re-seed the new distilled water entering the anoxic/aeration system. Excess waste activated sludge (WAS) may be removed from the system, such as through valve 355. Treated water passes from the MBR 340 to a storage tank 350. Although a treated water storage tank 350 is shown, this tank may be omitted and the permeate leaving the MBR 340 can be transferred directly to an ion exchange system 131 and/or a reverse osmosis system 132.

Although permeate, or purified water, leaving the membrane separation system 340 may meet the limitations of Table 1, above, in certain situations, additional processing may be required to further purify the water. Referring back to FIG. 2, water leaving membrane separation system 130 may be introduced to an ion exchange system 131 and/or a reverse osmosis system 132. These systems may be employed individually or in series to reliably remove varying concentrations of $NH_3$—N and/or $NO_x$—N as well as trace levels of organic and inorganic materials.

Figure 4:
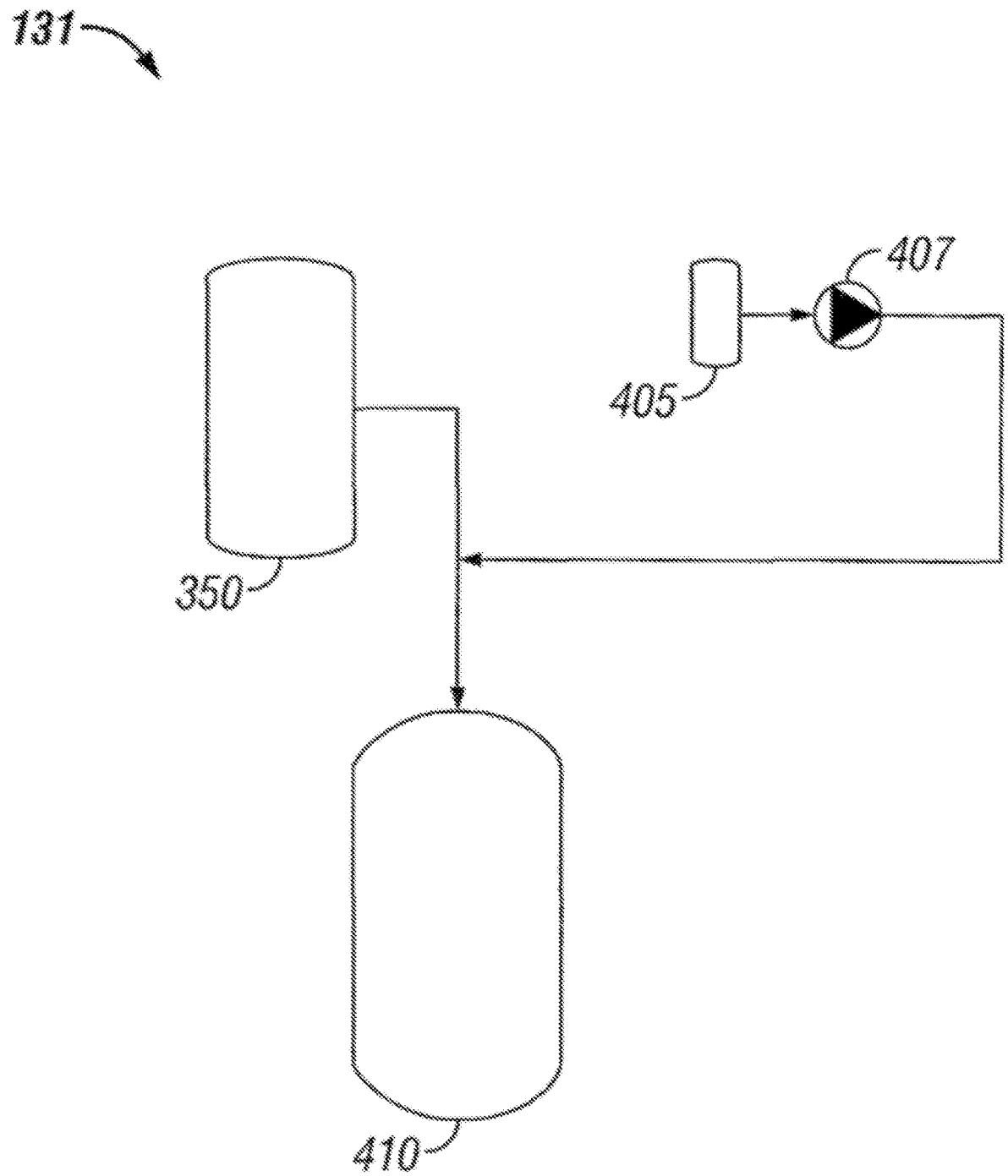
FIG. 4 provides a schematic diagram of a wastewater post-treatment system including ion exchange in accordance with an exemplary embodiment of the present invention.

FIG. 4 provides a schematic diagram of an ion exchange (IX) system 131 in accordance with an exemplary embodiment of the present invention. In certain situations, heterotrophic bacteria may inhibit the growth and activity of nitrifying bacteria to consume ammonia. In this situation, ion exchange offers an alternative or additional method in the removal of ammonia ions. Ion exchange offers a number of advantages to biological treatment alone, including the ability to handle spikes in influent ammonia levels or metals and the ability to operate over a wider range of temperatures. In other situations, the distilled water may contain barium concentrations which would exceed desired effluent quality or potentially harm the reverse osmosis membranes.

Referring to FIG. 4, water from the treated water storage tank 350 is introduced to an ion exchange column 410. Although a treated water storage tank 350 is shown, this tank may be omitted and the permeate leaving the MBR 340 can be transferred directly to the ion exchange column 410. The pH of water exiting the treated water storage tank 350 be adjusted by adding sodium hydroxide from tank 405 by a pump 407.

The IX column 410 is typically operated until breakthough. In one exemplary embodiment, the IX column 410 is actually two columns arranged in series in a lead/lag configuration. In a lead/lag the primary bed receives the contaminated water. This initial column the contaminant or contaminants of concern, usually to acceptable levels itself. The second column acts as a safeguard against contaminants remaining in the water following break-through of the primary column. Upon break-through, the primary column is regenerated and placed back into service, typically as the secondary column, with the secondary column now becoming the primary column. In an alternative embodiment, the system 131 includes two or more sets of ion exchange columns 410 that operate in parallel, with each set including a primary and secondary column in a lead/lag configuration. With a parallel arrangement, sets of columns can be taken offline to regenerate without stopping the process.

Figure 5:
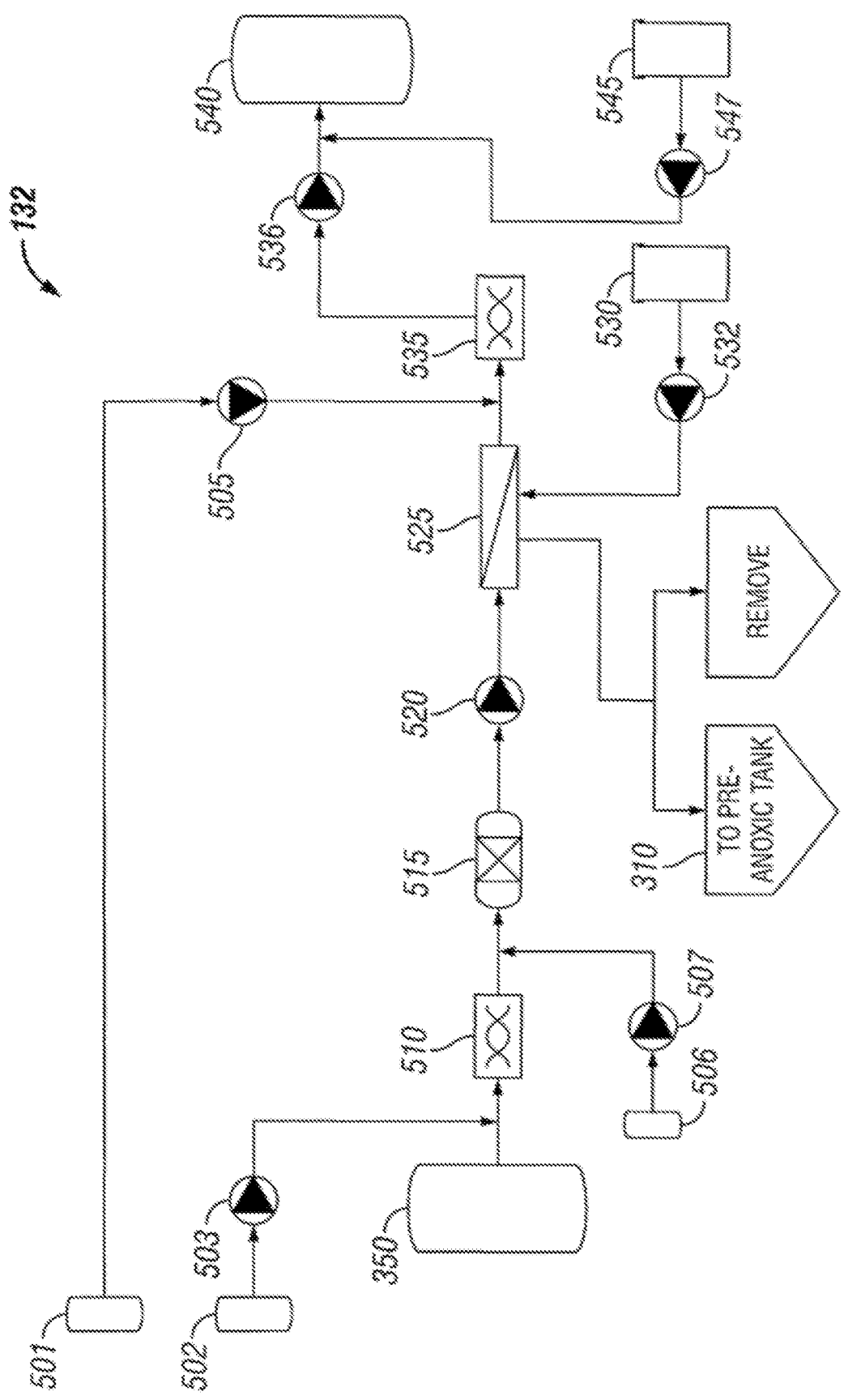
FIG. 5 provides a schematic diagram of a wastewater post-treatment system including reverse osmosis in accordance with an exemplary embodiment of the present invention.

FIG. 5 provides a schematic diagram of reverse osmosis system 132 in accordance with an exemplary embodiment of the present invention. Water from the treated water storage tank 350 is introduced into a mixer 510 to adjust the pH of the water. The pH of the water is adjusted to less than about 6.0 by adding, for example, $H_2SO_4$ or HCl stored in tank 502 and added by pump 503 and mixing in mixer 510. The pH adjustment step may be employed when the removal of $NH_3$—N is required to ensure that $NH_3$—N remains as ions and does not enter the gaseous phase.

An anti-scaling additive stored in tank 506 may be added to the pH-adjusted liquid through pump 507, and then liquid passed through a 1-micron pre-RO filter 515. The filtered liquid is then introduced to a reverse osmosis vessel 525 using a high-pressure reverse osmosis feed pump 520.

The reverse osmosis vessel 525 forces water from a region of high solute concentration through a semipermeable membrane to a region of low solute concentration by applying a pressure in excess of the osmotic pressure. In certain embodiments, the reverse osmosis membrane(s) employed include a dense layer in the polymer matrix (e.g., skin of an asymmetric membrane or an interfacial polymerized layer within a thin-film-composite membrane). The membrane may be designed to allow only water to pass through the dense layer, while preventing the passage of solutes. In one embodiment, the reverse osmosis includes a "sacrificial" member to increase recovery.

The reverse osmosis vessel 525 includes a number of modular "plug and play" reverse osmosis skids having any number of thin-film composite reverse osmosis membranes. The system includes one or more trains having multiple membranes that may be added or removed based on the amount of water to be processed. In one specific example, thirty-six (36) reverse osmosis membranes may be employed.

The reverse osmosis vessel 525 include a clean-in-place (CIP) system 530. The CIP system circulates cleaning liquids in a cleaning circuit through the reverse osmosis system. In certain embodiments the CIP system 530 may be skid-mounted. Through this cleaning process, trapped contaminants are removed from the reverse osmosis vessel 525 membranes.

The trapped materials removed from the reverse osmosis vessel 525 membranes may be recycled from the reverse osmosis vessel 525 to the anoxic and aerobic treatment system (FIG. 2 at 129). Specifically, the trapped materials removed from the reverse osmosis system 525 membranes may be used to re-seed the pre-anoxic tank (FIG. 3 at 310) (or removed from the system as waste or returned to the head of the pretreatment system (see FIGS. 1A and B).

Upon exiting the reverse osmosis vessel 525, the water may require pH elevation to ensure the pH is from about 6.0 to about 8.0, preferably about 7.0. To that end, the water may be passed through a pH adjustment system, which may include a metering pump 505 controlled by a downstream pH probe and an inline flash mixer 535. A base, such as but not limited to NaOH, may be added to the water from tank 501 and mixed with mixer 535.

The processed water may also require re-mineralization to prevent corrosion of downstream pipes, tanks, trucks, etc. As shown, brine from a brine tank 545 may be pumped using pump 547 and mixed into the water. The re-mineralized water is then stored in, for example, a pure water storage tank 540 before being shipped to an end user.

Either the ion exchange system 131, the reverse osmosis system 132, or both may be used to further treat the treated water that exits the MBR 340. The decision as to which system to employ may depend on economic factors and/or technical factors.

Referring back to FIG. 2, effluent water exiting the ion exchange system 131 or reverse osmosis system 132 may meet or exceed each of the required properties shown in Table 1, above. Accordingly, distilled water having the properties of Table 2 may be passed through the illustrated processing steps to be transformed into de-wasted water (water that can be managed in fresh water impoundments). In certain embodiments, the de-wasted water resulting from the above described treatment process may not be considered a waste as defined in 25 Pa. Code § 287.1. Moreover, the de-wasted water may be reused at oil and gas well sites such that a potential "closed loop" is created. In other embodiments, the de-wasted water may be used in any number of other applications or may simply be discarded into the environment or otherwise handled as fresh water. Distilled water having up to about 600 mg/L $cBOD_5$ may be processed using the methods described herein. The $cBOD_5$ level may be reduce to less than about 10 mg/L, less than about 5 mg/L, less than about 2.5 mg/L, or even less than about 1 mg/L. Distilled water having influent COD levels of less than about 8000 mg/L may be treated using the methods described herein. Such COD levels may be reduced to less than about 20 mg/L, less than about 15 mg/L, less than about 10 mg/L, or even less than about 5 mg/L in de-wasted water. In some embodiments, the COD levels of a de-wasted water may be reduced by about 95% to 99% or greater as compared to COD levels of influent distilled water.

In some embodiments, distilled water having influent $NH_3$—N levels of up to about 50 mg/L may be treated using the methods described herein. Such $NH_3$—N levels may be reduced to less than about 2.0 mg/L, less than about 1.5 mg/L, less than about 1.0 mg/L, or even less than about 0.5 mg/L. Similarly, the treatment methods may provide de-wasted water having effluent $NO_x$—N levels of less than about 2.0 mg/L, less than about 1.5 mg/L, less than about 1.0 mg/L, or even less than about 0.5 mg/L from distilled water having an influent $NO_x$—N level of about 0.6 mg/L.

The TSS levels of an exemplary de-wasted water subjected to the described treatment methods may be from about 0.1 mg/L to less than about 5 mg/L. In an exemplary embodiment, the TSS levels of a de-wasted water may be from about 0.5 mg/L to less than about 2 mg/L, and more particularly less than about 1 mg/L. Such results may be obtained by processing distilled water having an influent TSS level of up to about 15 mg/L, e.g., 10 mg/L or 5 mg/L.

In one exemplary embodiment, the system may be designed to handle maximum flows and 75 percentile $cBOD_5$ and nitrogen concentrations, as shown in Table 2. Higher influent loadings may be managed through equalization or diversion to a sewer. For example, the system may be designed to process up to about 300,000 gallons per day of distilled water having a pH from about 8 to about 11. Exemplary systems are compatible with distilled water having up to about 40 mg/L $NH_3$—N and up to about 60 mg/L total nitrogen at a temperature of from about 20 to about 40° C.

Table 3, below, shows the influent parameters supported by an exemplary system according to the invention:

TABLE 3

Exemplary Influent Design Parameters for Biological System

| Influent Parameters | Average | Maximum | Design Basis |
|---|---|---|---|
| Flow Rate (gpd) | 126,000 | 201,600 | 126,000 |
| COD (mg/L) | 750 | 1,250 | 2000 |
| COD (lb/day) | 788 | 2101 | 2101 |
| Total Nitrogen (mg/L) | 70 | 75 | 120 |
| Total Nitrogen (lb/d) | 74 | 126 | 126 |
| Total Phosphorus (mg/L) | <1 | <1 | <1 |
| TSS (mg/L) | 5 | 10 | 10 |
| Alkalinity (mg/L) | 260 | 260 | 260 |
| pH | | 8-11 | |
| Temperature | | 20-35° C. | |

Table 4, below, shows design parameters of an exemplary system according the invention:

TABLE 4

Exemplary Design Parameters for Biological System

| Design Parameters | Average | Max | Design Basis |
|---|---|---|---|
| Anoxic Tank (gal) | 15000 | 15000 | 15000 |
| Aerobic Tank 1 (gal) | 50000 | 50000 | 50000 |
| Aerobic Tank 2 (gal) | 50000 | 50000 | 50000 |
| Membrane Tanks (gal) | 12230 | 12230 | 12230 |
| HRT (h) | 24.2 | 15.1 | 24.2 |
| Mixed Liquor Temp. (° C.) | 20-34 | 20-34 | 20-34 |
| Mixed Liquor Suspended Solids in Aerobic Tank (mg/L) | 8000 | 10000 | 10000 |
| Mixed Liquor Volatile Suspended Solids in Aerobic Tank (mg/L) | 7420 | 9699 | 9810 |
| Solids Retention Time (SRT) (d) | 46.6 | 15.2 | 15.2 |
| RAS Flow From Membrane Tank (Q) | 4.0 | 4.0 | 4.0 |
| Sludge Wasting (gpd) (the excess growth that needs to be removed from the system) | 1730 @ 1% | 5350 @1.25% | 5300 @ 1.25% |
| Sludge Wasting/Influent Flow | 1.4% | 2.7% | 4.2% |
| Diffusers | Coarse Bubble | Coarse Bubble | Coarse Bubble |
| Max Process Air Flow (scfm) (for aeration tank) | 700 | 1490 | 1500 |

Although any known methods may be employed to determine whether the resultant de-wasted water meets the limitations of Table 1, in one embodiment, such a determination is made according to one or more of the following:

(a) A minimum of 14 consecutive daily flow proportional composite samples analyzed for strontium, barium and TDS;
(b) A minimum of 2 weekly flow proportional composite samples which are taken a minimum of 7 days apart analyzed for all constituents listed in Table 1 except ammonia, benzene, methanol, and toluene; and
(c) A minimum of 2 grab samples taken a minimum of 7 days apart analyzed ammonia, benzene, methanol, and toluene.

Moreover, once a de-wasted water is stored, it may be tested to determine whether it continues to meet the limitations of Table 1, by:
(a) Collecting daily flow proportional composite samples and analyzing them for strontium, barium and TDS;
(b) Collecting weekly flow proportional composite samples and analyzing them for all constituents listed in Table 1 except ammonia, benzene, methanol and toluene.
(c) Collecting weekly grab samples and analyzing them for ammonia, benzene, methanol and toluene.

Of course, modifications of the above testing methods may be implemented if desired or required.

Analytical methodologies used to determine whether a de-wasted water meets the requirements of Table 1 may include, but are not limited to, those in the Environmental Protection Agency's ("EPA") "Test Methods for Evaluating Solid Waste, Physical/Chemical Methods" (EPA SW-846), "Methods for Chemical Analysis of Water and Wastes" (EPA 600/4-79-020), "Standard Methods for Examination of Water and Liquid Waste" (prepared and published jointly by the American Public Health Association, American Water Works Association, and Water Pollution Control Federation), the Pennsylvania Department of Environmental Protection's "Sampling Manual for Pollutant Limits, Pathogens and Vector Attraction Reductions in Sewage Sludge" or any comparable method subsequently approved by the EPA or Department of Environmental Protection. Each of these documents is incorporated herein by reference in its entirety.

Figure 6A:
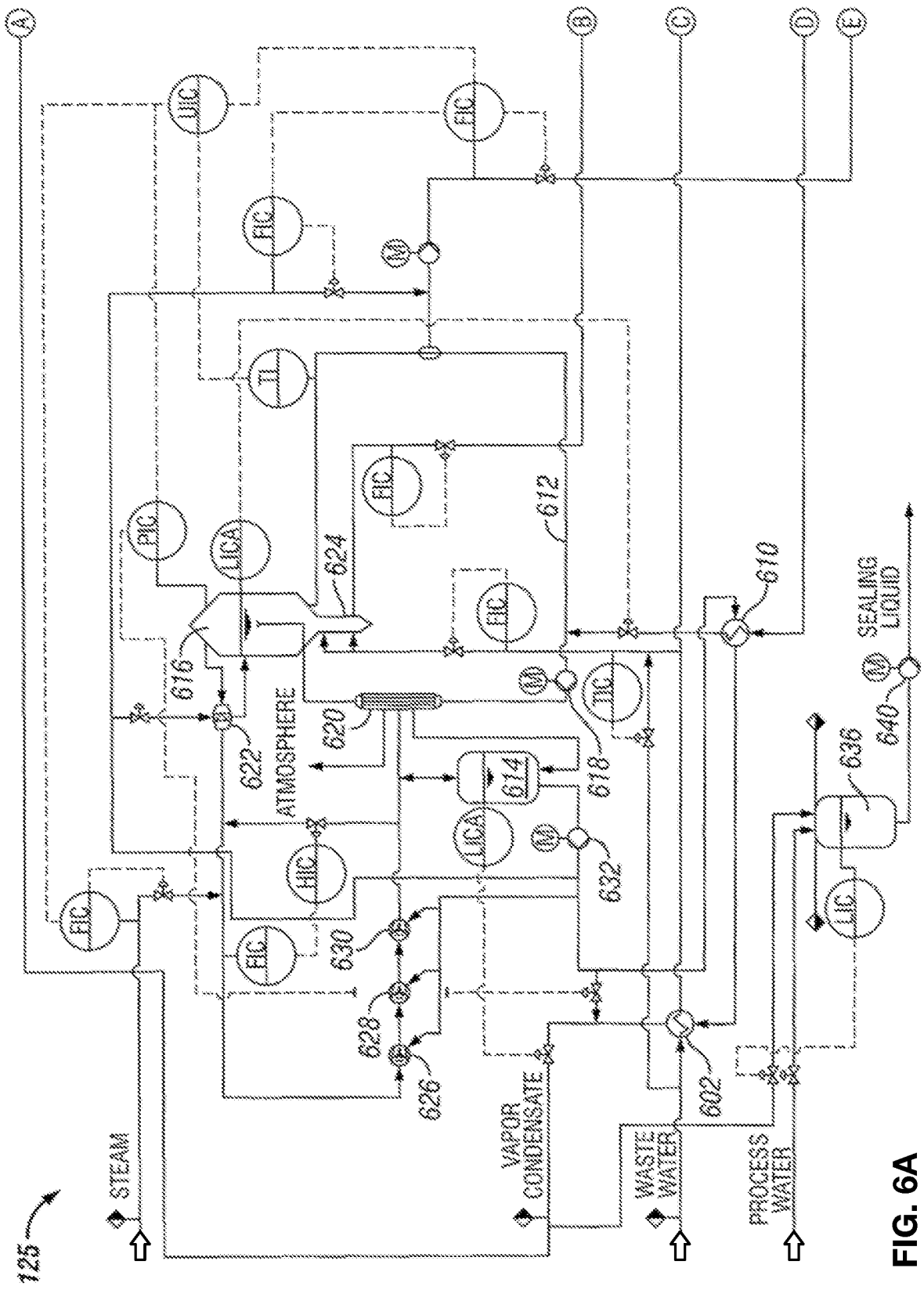
FIGS. 6A and B provide a schematic diagram of a crystallization plant in accordance with an exemplary embodiment of the present invention.
Figure 6B:
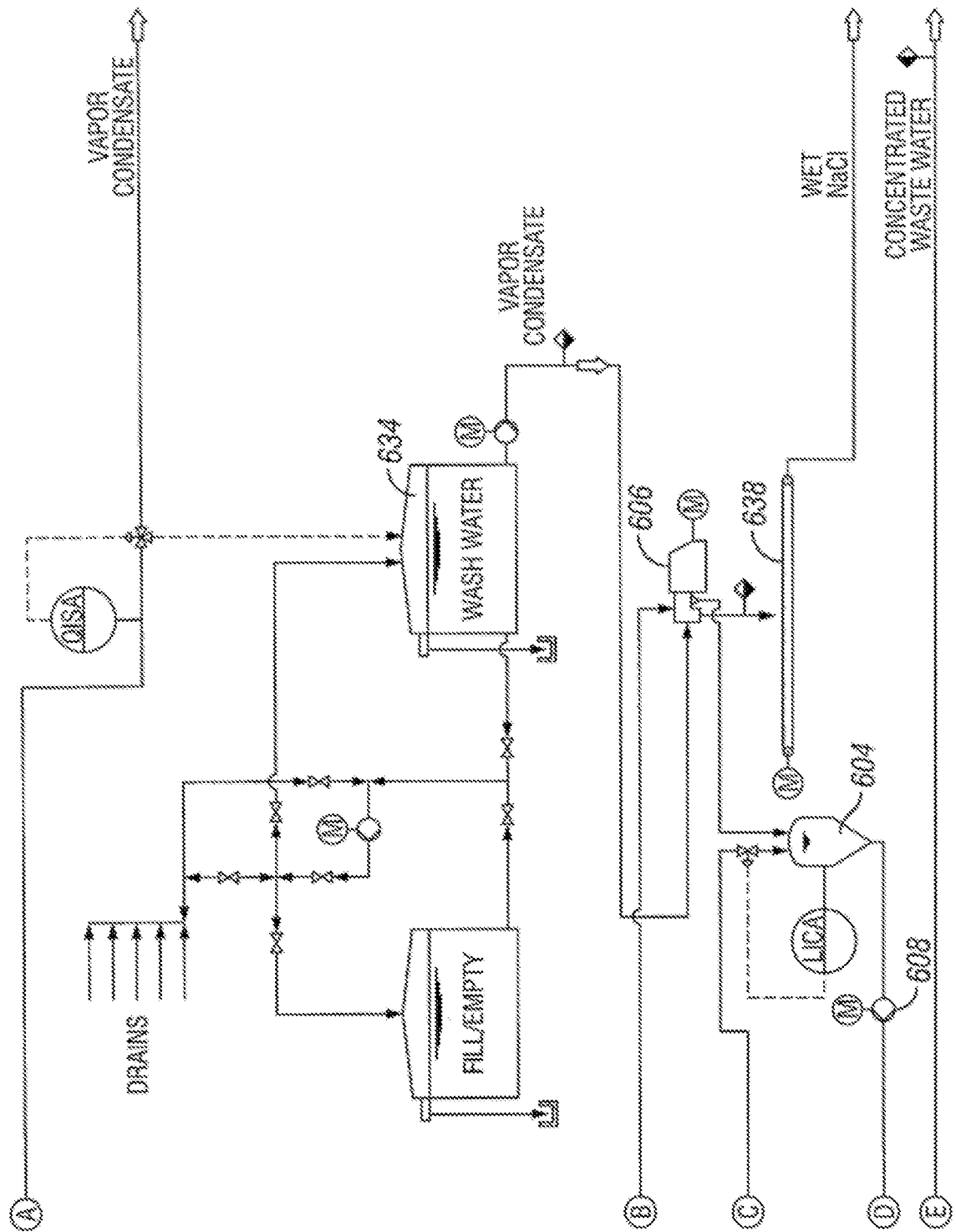

FIGS. 6A and B provide a detailed description of one embodiment of evaporation/crystallization unit 125. In the embodiment shown, evaporation/crystallization unit 125 is an MVR crystallization plant. Accordingly, FIGS. 6A and B provide a detailed description of the operation of evaporation/crystallization unit 125 along with concentrated brine storage (FIG. 1B at 136). From FIGS. 1A and B, brine from pretreated wastewater storage tanks 124c, 124d passes to evaporation/crystallization unit 125 via pipe 133. Similarly, wash water from distilled water storage tank 127 passes to evaporation/crystallization unit 125 via pipe 134.

Although the evaporation/crystallization unit 125 is shown integrated into the treatment facility shown in FIGS. 1A and B, it is understood that it could be a standalone facility or incorporated into a number of different treatment facility designs.

In one embodiment, wastewater (feed brine) is pumped continuously from the treatment facility through pipe 133 into the evaporation/crystallization plant 125.

The feed brine received by evaporation/crystallization plant 125 may be split into two streams. One stream may pass through the preheater 602 where it is heated by low temperature vapor condensate coming from preheater 610. Optimally, the wastewater stream passing though preheater 602 should be heated to a temperature in the range of around 122° F. After preheater 602 the feed brine is fed to the filtrate tank 604 where it is mixed with filtrate coming from the centrifuge 606. The mixture of filtrate and preheated feed brine is then pumped by pumps 608 from filtrate tank 604 to a second preheater 610. The brine passes through the second preheater 610. The second preheater 610 heats the feed brine using hot vapor condensate from condensation tank 614, which receives hot vapor from heating chest 620. Alternatively, other heaters may be used that do not rely on hot vapor from heating chest 620. The preheaters 602 and 610 can be washed periodically with condensate to dissolve incrustations. Therefore, both heat exchangers 602 and 610 can be by-passed as needed for maintenance. The preheated brine from the heat exchangers 602 and 610 passes through a control valve and into circulation piping 612. Optimally, preheated feed brine enters circulation piping 612 in the temperature of around 202° F.

The second stream of wastewater from pipe 133 may be used to regulate the temperature of the washing brine sent to salt leg 624. Optimally, the temperature of the washing brine should be less than 122° F.

Preheated feed brine and filtrate entering circulation pipe 612 is mixed with the evaporation brine that circulates in the circulation pipe of evaporator 616 (contains approx. 20% of crystals NaCl). The mixed brine is pumped by circulation pump 618 into the heating chest 620. In optimal conditions, the mixed brine will be in the temperature range of 255° F. By flowing through the tubes of heating chest 620, the mixture is heated up before entering evaporator 616 through a central inlet pipe. On the surface of the liquid level in evaporator 616 the overheated brine releases energy by flashing. Evaporated water exits the top of evaporator 616. Brine droplets carried by the evaporated water are separated by the demister 622 before the vapor is fed to the recompression group. In one embodiment, vapor exits the evaporator 616 at around 230° F. Due to the increase in temperature while passing through heating chest 620 and subsequent flashing in evaporator 616, the concentration of NaCl in the mixed brine in the evaporator body increases above the saturation point. Once above the brine saturation point, NaCl crystallization begins, and existing NaCl crystals grow larger. The smaller NaCl crystals are recycled into the circulation loop through circulation pipe 612. Larger NaCl crystals settle down in counter current flow of fresh feed and are washed from the purge in the salt leg 624. The small crystals do not settle down and are fluidized back to the evaporator 616 by the elutriation brine.

A certain amount of brine together with small seeding crystals leaves the evaporator 616 through the separation zone which is a part of the circulation pipe 612.

The collected salt in the salt leg 624 is treated with elutriation brine to:
replace mother liquor carrying a higher concentration of impurities (in solution),
flush back fines (NaCl solids) to the evaporator body,
enable further growing of small crystals,
fluidize the salt bed in the salt leg,
dilute the slurry for discharging to the centrifuges and
cool down the slurry to a lower temperature which is appropriate for solid liquid separation in pusher type centrifuges and for further salt transport on conveyors belt.

Vapor from the evaporator 616 is circulated from the evaporator 616 to the demister 622. Droplets of brine carried in the vapor are separated by the demister 622. The vapor in demister 622 flows through the set of corrugated plates, where brine droplets separate from the vapor phase at the plate walls. After flowing through demister 622, vapor passes to recompression group, blowers 626, 628, and 630. Recompression blowers increase the pressure and temperature of the vapor. In one embodiment, vapor temperature exiting the recompression group is around 269° F. and pressure is approximately 41 psi. Vapor from the recompression blowers is then passed to the heating chest 620 where it is condensed.

The demister 622 is periodically cleaned by vapor condensate delivered by pumps 632. The vapor condensate is sprayed by cleaning nozzles. The washing condensate is returned by free flow to evaporator 616.

Vapor condensate is partially reused to de-superheat recompressed vapors by means of the vapor condensate pumps 632 to supply the spray nozzles in recompression blowers 626, 628, and 630, as well as the cleaning nozzle of 622. Provision is made to dose NaOH-solution to neutralize the vapors coming from evaporator 616.

As the plant will be operated with wastewater with fluctuating composition, provision to dose NaOH is incorporated on demister 622. Caused by the high temperature in the evaporator body and presence of some salts, HCl may form in the brine slurry. This HCl will also be transported by vapors to the vapor demister 622 and downstream equipment like the blowers. To protect this equipment against corrosion by the HCl one embodiment includes an option to add NaOH to neutralize the HCl. A 5% w/w NaOH solution may be sprayed into the vapor duct right after the demister 622.

Vapors may be recompressed by three blowers 626, 628, and 630 in series. The three blowers connected in series increase the pressure of the vapor in order to recover energy for further evaporation. Although three blowers are shown, one skilled in the art understands that any number of blowers may be used. Compressed vapor is condensed by the same waste water from which it originates at a higher pressure and temperature. The saturation temperature of the recompressed vapor is higher than the temperature of the brine slurry which is circulated in the evaporation system in circulation pipe 612, and therefore the compressed vapor can be used to heat the circulating brine slurry. Vapor condenses on the shell side of the heating chest 620. Before the compressed vapor enters the heating chest 620, condensate is sprayed into the vapor lines (622, 626, 628, and 630) to decrease the temperature to the saturation temperature and increase heat transfer in heating chest 620.

The suction lines of all blowers are drained via steam traps. One skilled in the art appreciates the evaporation load can be regulated by adjusting a variable frequency drive.

Low pressure steam at 22 psig (1.5 barg) is used for start-up of the plant and to make up the pressure in the system if the feed is too cold. Vapor condensate coming from heating chest 620 and steam condensate are collected in condensation tank 614.

From the condensation tank 614, the steam condensate is pumped through the preheaters 610 and 602 by means of condensate pumps 632. Condensate pumps 632 are redundant and typically operate with one on standby.

The condensate pumps 632 are also used to supply cleaning nozzles of the demister 622 and to de-superheat the vapors leaving the recompression pumps 626, 628, and 630 before the vapor is sent to the heating chest 620. After recovery of the heat in the brine preheaters the vapor condensate is sent to the battery limit or the wash water tank 634.

Vapor condensate coming from condensation tank 614, after passing pre-heaters 610 and 602, is also used to supply sealing water tank 636 and to dilute mother liquor before the purge is sent out of battery limits.

The air and vapors mix affects the heat transfer by accumulating non-condensable air (i.e., air that has entered the system and dissolved into the feed brine) in heat exchangers. Therefore, the heating chest 620 is continuously vented via restriction orifice mounted on the top of ventilation line.

NaCl slurry withdrawn from the salt leg 624 is discharged continuously to the centrifuge 606.

The centrifuge 606 separates salt crystals from brine. The salt crystals from the centrifuges are transported by means of reversible chutes and put on the conveyor belt 638 and transported to the salt storage and/or salt management facilities. The filtrate flows into the filtrate tank 604. From there, it is pumped together with the feed brine via pump 608 to the preheater[s] 610.

In the centrifuges, the cake of salt crystals can be further upgraded by spraying condensate to wash off mother liquor from the surface of the crystals. This increases the purity of the product. In one embodiment, saturated low-pressure steam 22 psig (1.5 barg) from the battery limit is made available to the MVR plant for heating of heating chest 620 during start-up of the MVR part of the plant and to make up heating during normal operation in heating chest 620 if more heat is required than provided by the blowers.

Steam condensate is mixed with vapor condensate and collected in condensation tank 614. Condensate from condensation tank 614 is pumped by means of pump 632 to heaters 610 and 602 to pre-heat the feed brine which is pumped counter currently from pipe 133 to circulation pipe 612. Pump 632 supplies the sealing water tank 636 and the wash water tank 634 with condensate. The condensate is used as wash water and flush water. Pump 640 is used to supply wash water and seal water to various consumers. It also supplies hose connections to flush pipelines and equipment manually. Pump 640 supplies brine pumps with sealing water. The quality of the condensate is monitored by a conductivity meter. Condensate having very high conductivity can be accumulated in wash water tank 634 and send out of the plant from there.

Wash water supplied by pump 640 may be used to flush salt slurry pipelines, to flush sight glasses, to fill siphons, and to flush the centrifuge 606.

The process water has to have drinking water quality and can be used independently from the production plant. This is, because it is used for the eye wash and shower stations. The process water is additionally used to feed the sealing water tank 636 if there is not enough vapor condensate available.

Sealing water is taken from the sealing water tank 636 by means of pumps 640 and fed into the sealing water piping system. Strainers associated with pump 640 remove dirt from the sealing water to avoid clogging of small pipes in the sealing water system. Tank 636 is fed by vapor condensate with pump 632. If there is too little vapor condensate available, the sealing water tank will be filled up by process water.

Pumps 640 operate as a pair, with one on standby. If one pump fails, the second one will start automatically.

Sealing water is supplied to pumps that handle hot brine or slurry, the sensing lines of pressure/level instruments, and circulation pump 618.

Cooling water from battery limit is used to cool the oil of the centrifuge 606.

Instrument air is used for those components that are driven pneumatically in the plant, such as the actuators of the control valves.

Utility stations shall be foreseen on each level at central positions of the plant. Connections for pressurized air and process water are required.

In case of electrical power failure, the circulation pipe 612 must be drained of crystals as soon as possible. To keep crystals fluidized until a drain operation is completed, an emergency pump or pumps are provided. Emergency pumps keep the crystals near pump 618 fluidized, until the shut down or restart of the system is completed.

EXAMPLES

Figure 7:
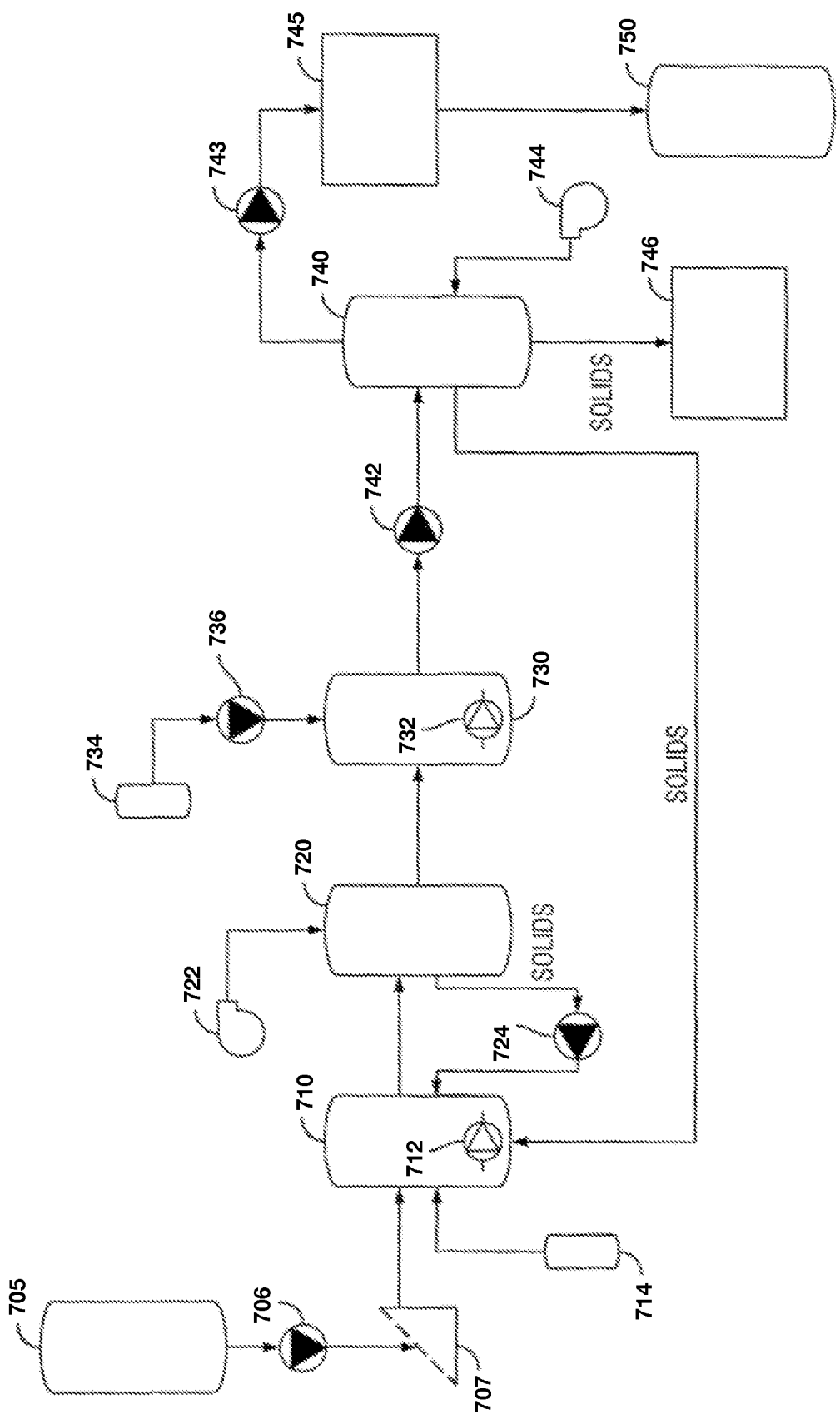
FIG. 7 provides a schematic diagram of a wastewater treatment system in accordance with an exemplary embodiment of the present invention.

An exemplary pilot-sized distilled water processing system was tested with an oil and gas liquid waste distillate. A schematic of the pilot sized plant 700 is illustrated in FIG. 7. As shown, the pilot plant included a 64-gallon pre-anoxic tank 710, a 210-gallon aeration tank 720, a 65-gallon post-anoxic tank 730, a 90-gallon MBR 740, and an ion exchange system 745. The total volume of the pilot system was about 420 gallons. Distilled water from tank 705 is pumped via pump 706 through strainer 707 (less than one-eighth inch mesh) to the pre-anoxic tank 710. The pre-anoxic tank 710 includes a submersible pump 712 to mix the tank. Phosphorus, as phosphoric acid, is added from tank 714 to the pre-anoxic tank 710.

Treated water passed from the pre-anoxic tank 710 to the aeration tank 720. Air is added to the aeration tank 720 using aeration blower 722. Nitrates are recycled from the aeration tank to the pre-anoxic tank 710 by the nitrate recycle pump 724.

Treated water then passes to the post-anoxic tank 730. Carbon is added using a carbon source from tank 734 through carbon dosing pump 736. The post-anoxic tank 730 includes a submersible pump 732 to mix the tank contents. A recycle pump 742 transfers the treated water into the membrane tank 740. Air from an aeration blower 744 is used to scour the membranes.

Permeate is sent from the membrane tank 740 through an ion exchange system 745 and into an effluent container 750. Pump 743 removes the permeate from the membrane tank 740. Solids are removed to a batch WAS container 746 or gravity feed back to the pre-anoxic tank 710.

Figure 8:
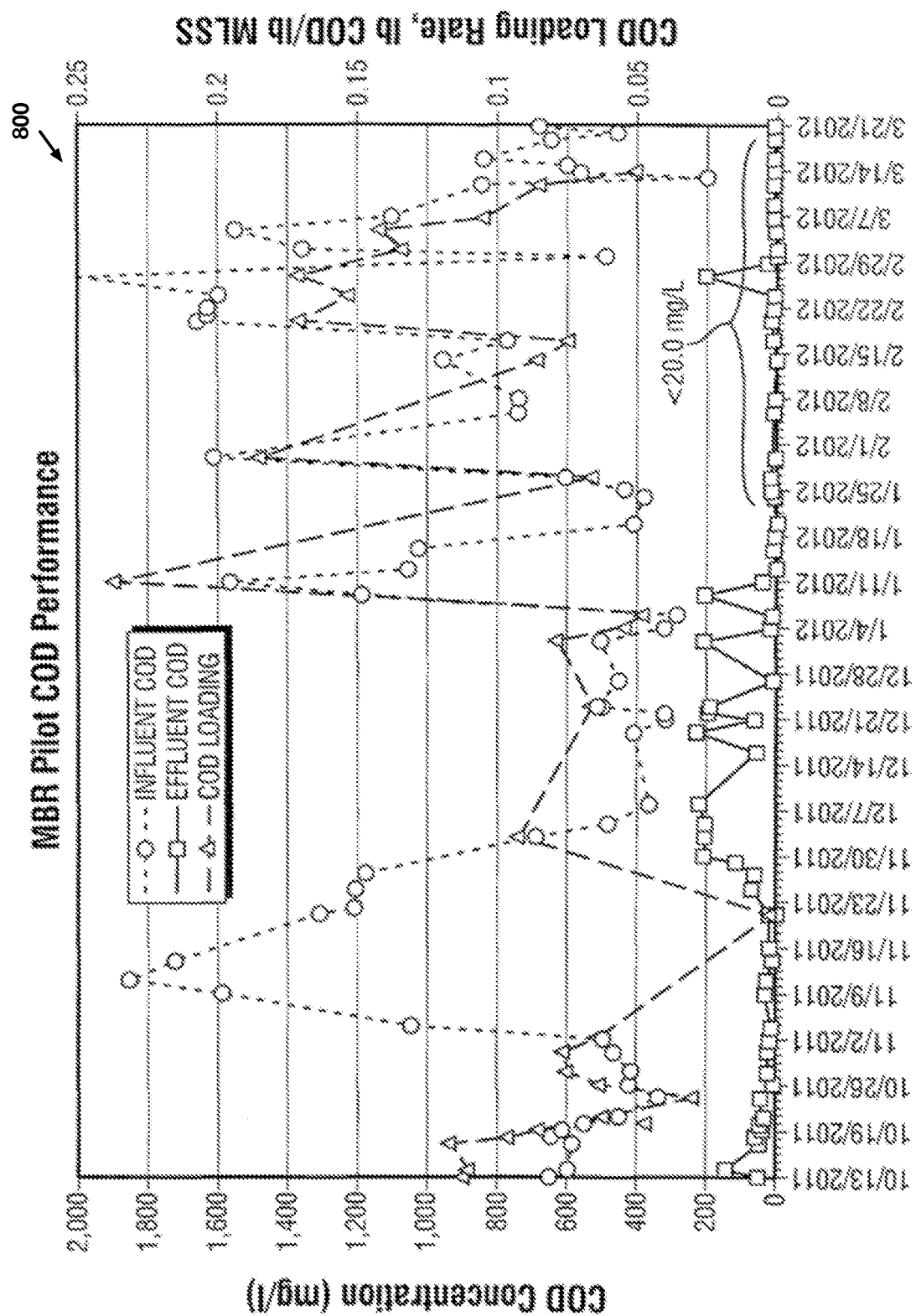
FIG. 8 depicts a graph illustrating the chemical oxygen demand values for the influent, effluent, and loading for an operation of a pilot plant in accordance with the wastewater treatment process depicted in FIG. 7 and employing ion exchange.
Figure 9:
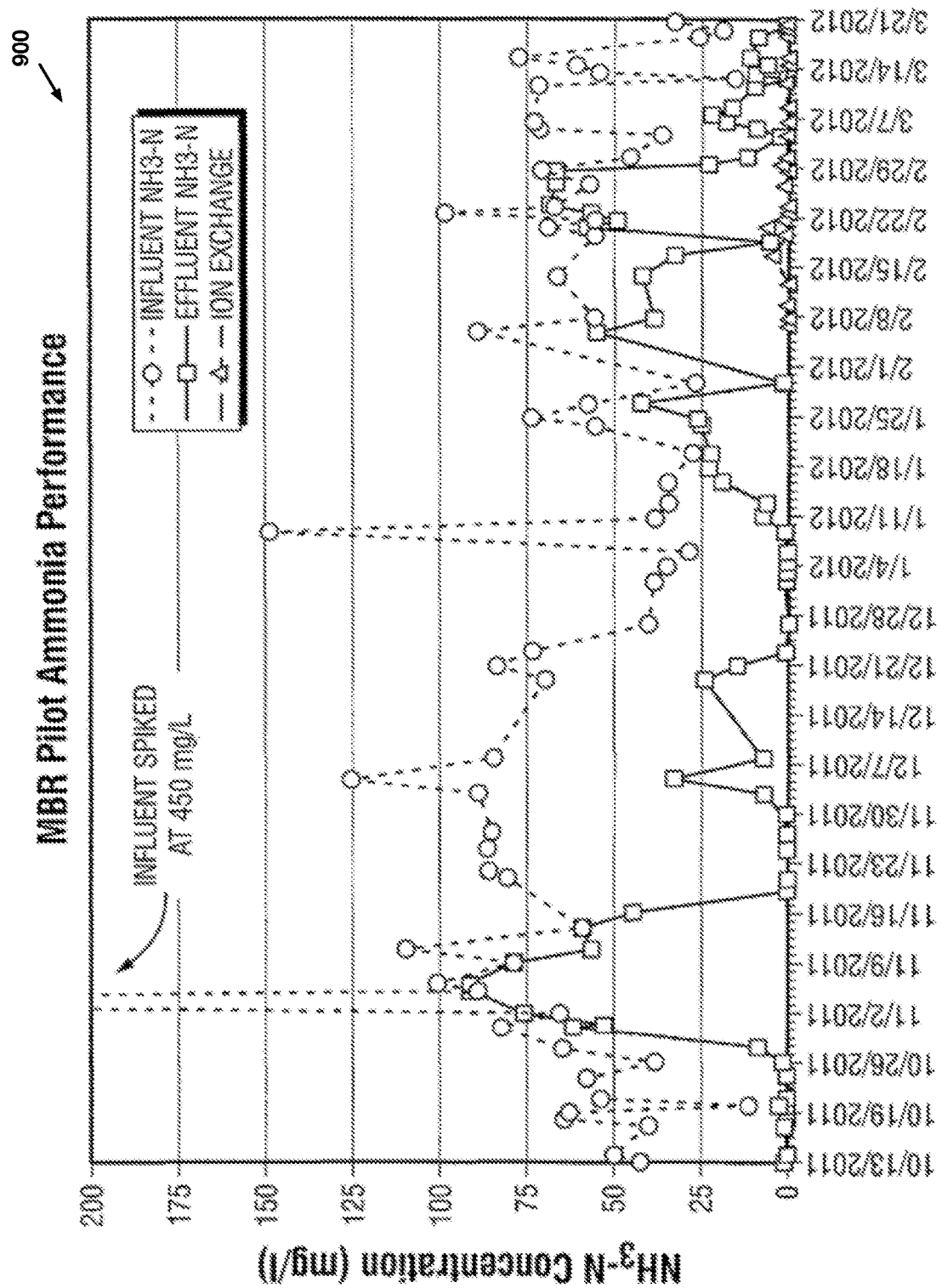
FIG. 9 depicts a graph illustrating the ammonia values for the influent and effluent for an operation of a pilot plant in accordance with the wastewater treatment process depicted in FIG. 7.
Figure 10:
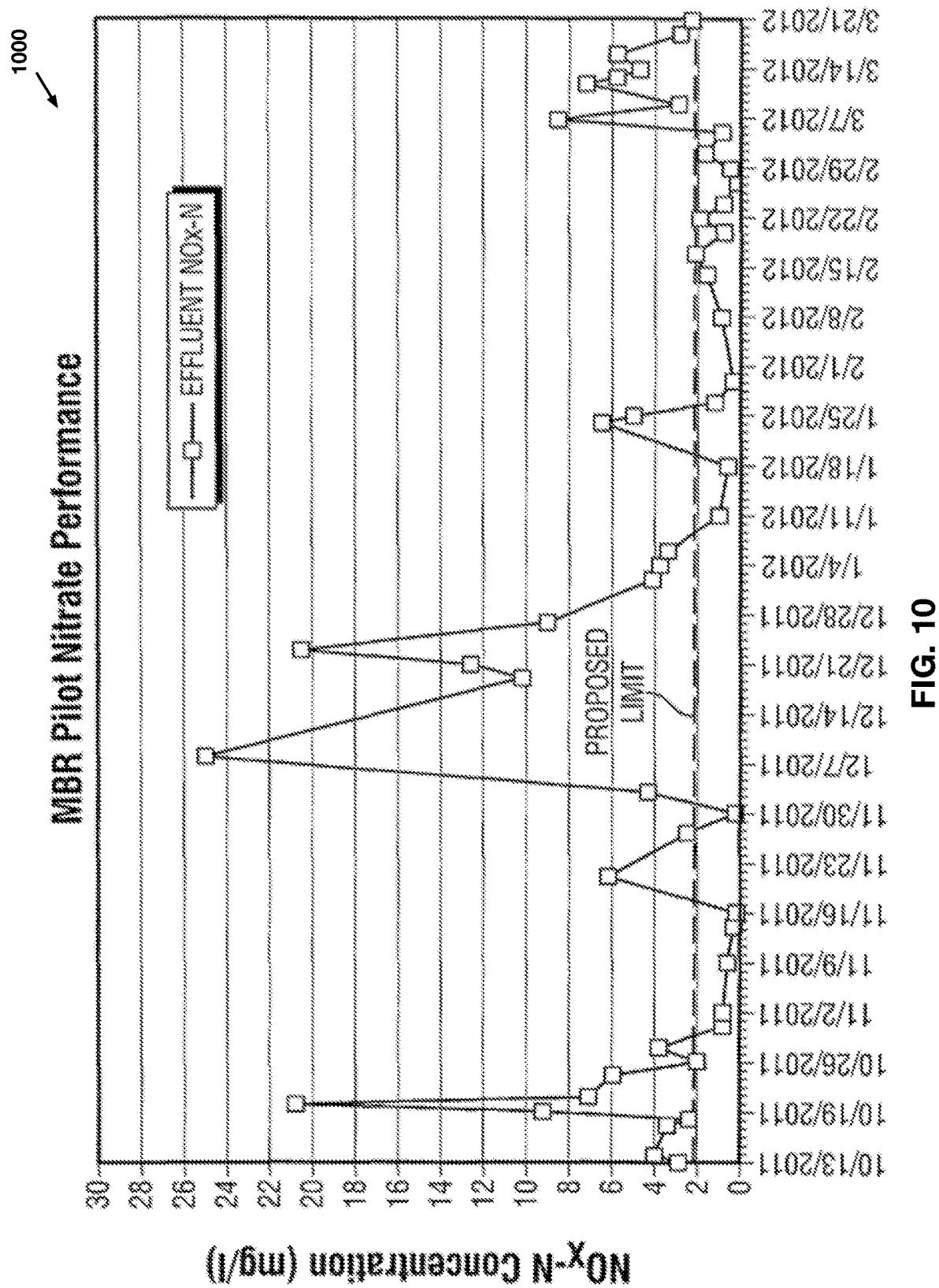
FIG. 10 depicts a graph illustrating the nitrate values for the effluent for an operation of a pilot plant in accordance with the wastewater treatment process depicted in FIG. 7.

A seed sludge was obtained from a municipal sewage plant and screened to less than 3 mm before adding to the pre-anoxic tank 710 of the pilot plant. The pilot system was then operated with influent distilled water falling within the parameters shown in Table 2 above for approximately 2 months for the bacteria in the process to acclimate to the specific wastewater characteristics and reach "steady state." The pilot system was run multiple times from October 2011 to at least March of 2012, and the performance of the system is shown graphically in FIGS. 8-10. FIG. 8 depicts a graph 800 illustrating the chemical oxygen demand values for the influent, effluent, and loading for an operation of a pilot plant 700 in accordance with the wastewater treatment process depicted in FIG. 7 and employing ion exchange. FIG. 9 depicts a graph 900 illustrating the ammonia values for the influent and effluent for an operation of a pilot plant 700 in accordance with the wastewater treatment process depicted in FIG. 7. FIG. 10 depicts a graph 1000 illustrating the nitrate values for the effluent for an operation of a pilot plant 700 in accordance with the wastewater treatment process depicted in FIG. 7.

Referring to FIG. 8, the COD concentration of the influent water entering the pilot system and the effluent water exiting the pilot system are shown. Upon the addition of an ion exchange system to the pilot plant, the COD concentration of the effluent water was found to be consistently less than about 20 mg/L.

Referring to FIG. 9, the $NH_3$—N concentration of the influent water entering the pilot system and the effluent water exiting the pilot system are shown. Upon the addition of an ion exchange system to the pilot plant, the $NH_3$—N concentration of the effluent water was found to be consistently less than about 2.0 mg/L.

Referring to FIG. 10, the $NO_3$—N concentration of the influent water entering the pilot system and the effluent water exiting the pilot system are shown. Upon the addition of an ion exchange system to the pilot plant, the $NO_3$—N concentration of the effluent water was found to be consistently less than about 2.0 mg/L.

Figure 11:
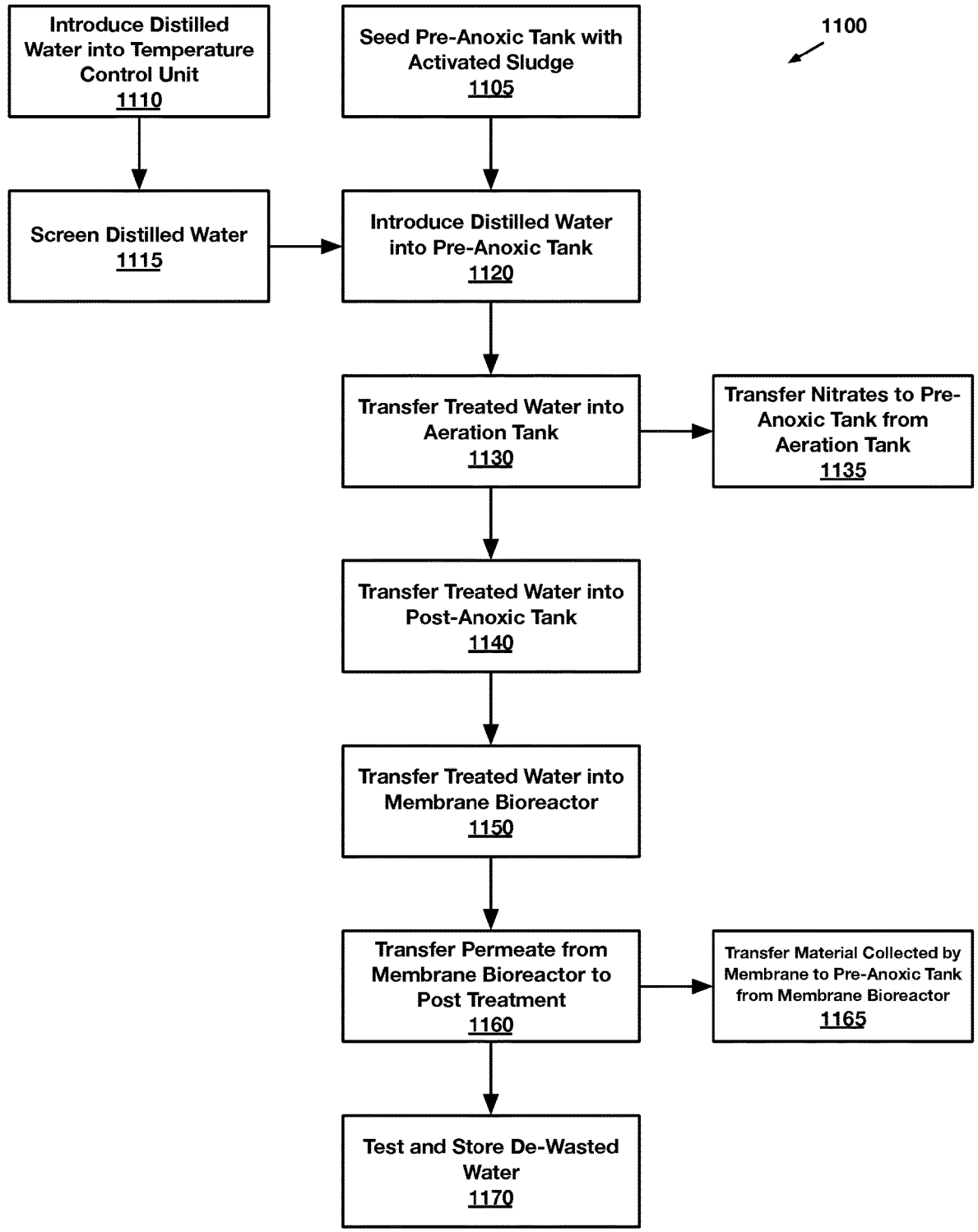
FIG. 11 presents a process flow diagram for a wastewater treatment process in accordance with an exemplary embodiment of the present invention.

FIG. 11 presents a process flow diagram for a wastewater treatment process 1100 in accordance with an exemplary embodiment of the present invention. Referring to FIGS. 1A and B, 2, 3, 4, 5, and 10, at step 1105, the pre-anoxic tank, such as pre-anoxic tank 310, is seeded with activated sludge. This sludge includes bacteria and other micro-organisms that remove nitrogen from a waste stream through microbial action.

At step 1110, a distilled water product enters a temperature control system, such as temperature control system 205, where the temperature of the distilled water product is adjusted to between 20° C. to 35° C. The distilled water product may be the result of pretreating and distilling wastewater from oil and natural gas production. In some cases, the temperature of the water will need to be increased to satisfy the temperature range of between 20° C. to 35° C. In most cases, the temperature will need to be lowered. In still some cases, the temperature of the distilled water product will be within the desired temperature range without adjustment.

At step 1115, the distilled water product is pre-filtered, or screened, to remove solids from the distilled water. Such as by pre-filter 210. The screen mesh size ranges from a mesh size capable of removing particles of at least ¹⁄₂₀ inch in size to a mesh size capable of removing particles greater than about ¼ inch in size.

At step 1120, the distilled water product is introduced into the pre-anoxic tank. Once in the tank, microbes contained in the tank digest nitrogen-containing compounds in a denitrification process under anaerobic conditions. Phosphorus, such as in the form of phosphoric acid, may be added to the pre-anoxic tank to provide nutrients for the micro-organisms. Nitrogen gas is released out of the pre-anoxic tank.

At step 1130, the water treated in the pre-anoxic tank is transferred to an aeration tank, such as aeration tank 320, where nitrogen compounds are nitrified by bacteria under aerobic conditions. Air is provided to the tank to facilitate the microbial action. Nitrates from the aeration tank are recycled to the pre-anoxic tank at step 1135.

At step 1140, the water treated in the aeration tank is transferred to a post-anoxic tank, such as post-anoxic tank 330, to remove residual nitrate by denitrification. If necessary, additional carbon is added to facilitate the nitrate removal process. Micro-organisms in the water perform the denitrification under anaerobic conditions.

At step 1150, the water treated in the post-anoxic tank is transferred to a membrane separator, such as membrane bioreactor 340. At this step, microbial action continues on the input side of the membrane. The treated water is forced through the membrane, removing the micro-organisms and other solids from the treated water. The permeate—the purified water that has passed through the membrane—is collected for further treatment.

At step 1160, the permeate from the membrane bioreactor is further treated in a reverse osmosis system or an ion exchange system.

At step 1165, the membrane of the membrane bioreactor is scoured by air to remove the trapped materials, which may be recycled into the pre-anoxic tank as a source of activated sludge.

At step 1170, the water treated in the ion exchange system and/or reverse osmosis system is collected and tested to demonstrate compliance with de-wasted water criteria. The water, once demonstrated to be de-wasted water, may be reused.

It is understood by those skilled in the art that the drawings are diagrammatic and that further items of equipment such as reflux drums, pumps, vacuum pumps, temperature sensors, pressure sensors, pressure relief valves, control valves, flow controllers, level controllers, holding tanks, storage tanks, and the like may be required in a commercial plant.

What is claimed is:

1. A system for treating wastewater comprising:
    a wastewater input line for receiving wastewater;
    a storage tank for receiving and storing the wastewater from the input line to allow the wastewater to be screened for a total dissolved solids ("TDS") concentration and a methanol concentration;
    a methanol treatment system for removing methanol from the wastewater;
    a pretreatment system configured to pretreat the wastewater to produce a pretreated wastewater suitable for crystallization/evaporation;
    a routing system in communication with the storage tank, the methanol treatment system and the pretreatment system, the routing system adapted to:
        route the wastewater through the methanol treatment system when the methanol concentration is greater than 500 mg/L; and
        route the wastewater through the pretreatment system only when the TDS concentration is at least 150,000 mg/L;
    an evaporation/crystallization unit configured to produce, from the pretreated wastewater, a distilled water, a concentrated brine comprising $CaCl_2$, and a salt slurry comprising NaCl;
    a purification system configured to receive a first portion of the distilled water from the evaporation/crystallization unit and remove contaminants therefrom to produce a purified water; and
    a post-treatment system comprising at least one of an ion exchange system and a reverse osmosis system, the post-treatment system configured to convert the purified water from the purification system into a de-wasted water.

2. A system according to claim 1, further comprising a centrifuge configured to:
    receive the salt slurry produced by the evaporation/crystallization unit; and
    dewater the salt slurry to produce a centrate/filtrate and a sodium chloride product comprising NaCl crystals.

3. A system according to claim 2, further comprising a circulation line connected to the centrifuge and the evaporation/crystallization unit, the circulation line configured to route back to the evaporation/crystallization unit the centrate/filtrate produced by the centrifuge.

4. A system according to claim 3, wherein the centrate/filtrate from the circulation line is mixed with the pretreated wastewater as the pretreated wastewater is fed to the evaporation/crystallization unit.

5. A system according to claim 2, wherein the sodium chloride product comprises greater than 98% w/w NaCl.

6. A system according to claim 1, further comprising a washer system configured to:
    receive a second portion of the distilled water from the evaporation/crystallization unit; and
    wash the salt slurry with the second portion of the distilled water.

7. A system according to claim 1, wherein the evaporation/crystallization unit is further configured to produce a vapor comprising liquid droplets.

8. A system according to claim 7, further comprising a demister configured to remove the liquid droplets from the vapor to produce a demisted vapor.

9. A system according to claim 8, further comprising a compression unit configured to compress the demisted vapor to produce a compressed vapor.

10. A system according to claim 9, further comprising a heating chest configured to receive the compressed vapor from the compression unit.

11. A system according to claim 10, further comprising a circulation line configured to:
    receive a second portion of the distilled water from the crystallizer/evaporator unit; and
    circulate the second portion of the distilled water from the crystallizer/evaporator unit, through the heating chest, and back into the crystallizer/evaporator unit.

12. A system according to claim 1, further comprising a second stage thermal mechanical evaporation/crystallization unit configured to:
    receive the concentrated brine produced by the evaporation/crystallization unit; and
    produce a high-purity calcium chloride product from the concentrated brine.

13. A system according to claim 12, wherein the high-purity calcium chloride product comprises approximately 35% w/w $CaCl_2$).

14. A system according to claim 13, wherein the concentrated brine comprises approximately 18% to 20% w/w $CaCl_2$).

15. A system according to claim 12, wherein the second stage thermal mechanical evaporation/crystallization unit is further configured to generate solid crystals from the concentrated brine, the solid crystals comprising one or more of: barium, strontium and sodium.

16. A system according to claim 12, further comprising a lithium removal system configured to remove lithium from the concentrated brine before the concentrated brine is received by the second stage thermal mechanical evaporation/crystallization unit.

17. A system according to claim 1, wherein the evaporation/crystallization unit is a mechanical vapor recompression ("MVR") crystallizer.

18. A system according to claim 1, wherein the pretreatment system comprises one or more of: a pH adjustment/chemical addition tank, a flocculation tank, a clarifier, and an equalization tank.

19. A system according to claim 1, wherein the purification system comprises:
    an anoxic treatment system configured to denitrify nitrogen compounds in the first portion of the distilled water under anaerobic conditions to produce a denitrified distilled water therefrom;

an aerobic treatment system configured to nitrify additional nitrogen compounds in the denitrified distilled water under aerobic conditions to produce a nitrified distilled water therefrom; and a membrane separation system comprising a membrane, the membrane separation system configured to remove the contaminants from the nitrified distilled water to produce the purified water.

20. A system according to claim 1, wherein the de-wasted water comprises a chemical oxygen demand ("COD") of less than or equal to 15 mg/L, a methanol concentration of less than or equal to 3.5 mg/L, a nitrite-nitrate nitrogen concentration of less than or equal to 2 mg/L, a sodium concentration of less than or equal to 25 mg/L, a TDS concentration of less than or equal to 500 mg/L, and a total suspended solids ("TSS") concentration of less than or equal to 45 mg/L.

* * * * *